United States Patent
Takahashi

(10) Patent No.: US 11,223,736 B2
(45) Date of Patent: Jan. 11, 2022

(54) PRINTING SYSTEM CAPABLE OF PERFORMING POST-PROCESSING TO SHEETS AFTER IMAGE FORMATION AND CONTROL METHOD THEREOF

(71) Applicant: CANON KABUSHIKI KAISHA, Tokyo (JP)

(72) Inventor: Katsuyuki Takahashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/803,781

(22) Filed: Feb. 27, 2020

(65) Prior Publication Data

US 2020/0204696 A1    Jun. 25, 2020

Related U.S. Application Data

(63) Continuation of application No. 16/205,552, filed on Nov. 30, 2018, now Pat. No. 10,609,240, which is a
(Continued)

(30) Foreign Application Priority Data

Jan. 15, 2007    (JP) .................................. 2007-006421

(51) Int. Cl.
*H04N 1/00* (2006.01)
*G06F 3/12* (2006.01)
(Continued)

(52) U.S. Cl.
CPC ......... *H04N 1/00925* (2013.01); *B65H 37/06* (2013.01); *B65H 45/142* (2013.01);
(Continued)

(58) Field of Classification Search
CPC ............. H04N 1/00925; H04N 1/0032; H04N 1/00384; H04N 1/00411; H04N 1/00623;
(Continued)

(56) References Cited

U.S. PATENT DOCUMENTS 5,075,785 A * 12/1991 Sugishima ............. H04N 1/387
358/448
5,554,094 A    9/1996 Viens
(Continued)

FOREIGN PATENT DOCUMENTS

JP    2001-042583 A    2/2001
JP    2004-264425 A    9/2004
(Continued)

OTHER PUBLICATIONS

The above foreign references #1-2 were cited in a Jul. 4, 2011 Japanese Office Action, submitted in related U.S. Appl. No. 16/205,552 without an English Translation, that issued in Japanese Patent Application No. 2007-006421.

*Primary Examiner* — Allen H Nguyen
(74) *Attorney, Agent, or Firm* — Cowan, Liebowitz & Latman, P.C.

(57) ABSTRACT

In a printing system capable of supplying a sheet of a job having undergone print processing by the printing unit of a printing apparatus to a post-processing unit capable of executing at least a specific type of post-processing among a plurality of types of post-processes, when the target job requires the specific type of post-processing, the printing apparatus is inhibited from executing print processing of the job without explicitly determining a sheet necessary for the print processing of the job by a user using a user interface unit. When the target job does not require the specific type of post-processing, the printing apparatus is permitted to execute print processing of the job without explicitly deter-
(Continued)

mining a sheet necessary for the print processing of the job by the user using the user interface unit.

40 Claims, 28 Drawing Sheets

Related U.S. Application Data continuation of application No. 15/466,211, filed on Mar. 22, 2017, now Pat. No. 10,178,259, which is a continuation of application No. 15/067,817, filed on Mar. 11, 2016, now Pat. No. 9,641,711, which is a continuation of application No. 14/445,677, filed on Jul. 29, 2014, now Pat. No. 9,311,578, which is a continuation of application No. 12/013,049, filed on Jan. 11, 2008, now Pat. No. 8,836,966.

(51) Int. Cl.
    *H04N 1/23*     (2006.01)
    *B65H 37/06*     (2006.01)
    *G06K 15/00*     (2006.01)
    *G06K 15/02*     (2006.01)
    *B65H 45/14*     (2006.01)
    *G03G 15/00*     (2006.01)

(52) U.S. Cl.
CPC ....... *G03G 15/6538* (2013.01); *G06F 3/1208* (2013.01); *G06F 3/1255* (2013.01); *G06K 15/1809* (2013.01); *G06K 15/1868* (2013.01); *G06K 15/4065* (2013.01); *H04N 1/0032* (2013.01); *H04N 1/00384* (2013.01); *H04N 1/00411* (2013.01); *H04N 1/00623* (2013.01); *H04N 1/00639* (2013.01); *H04N 1/00952* (2013.01); *H04N 1/2323* (2013.01); *B65H 2301/45* (2013.01); *G06K 2215/0011* (2013.01); *H04N 2201/0094* (2013.01)

(58) Field of Classification Search
CPC ........... H04N 1/00639; H04N 1/00952; H04N 1/2323; H04N 2201/0094; G03G 15/6538; B65H 45/142; B65H 37/06; B65H 2301/45; G06K 15/1809; G06K 15/1868; G06K 15/4065; G06K 2215/0011; G06F 3/1208; G06F 3/1255

USPC ....................................................... 358/1.14
See application file for complete search history.

(56) References Cited

U.S. PATENT DOCUMENTS

| | | | |
|---|---|---|---|
| 5,678,135 A | 10/1997 | Fukui et al. | |
| 5,735,515 A | 4/1998 | Hayashi et al. | |
| 5,768,677 A * | 6/1998 | Natsume | G03G 15/6582 399/376 |
| 6,349,829 B1 | 2/2002 | Matheis et al. | |
| 6,868,253 B2 | 3/2005 | Ueda et al. | |
| 7,580,667 B2 * | 8/2009 | Ueda | G03G 15/6508 399/407 |
| 7,826,788 B2 | 11/2010 | Ueda et al. | |
| 2003/0123894 A1 | 7/2003 | Ueda et al. | |
| 2004/0126122 A1 | 7/2004 | Kanamoto et al. | |
| 2004/0136732 A1 | 7/2004 | Okamoto et al. | |
| 2004/0179222 A1 | 9/2004 | Sato et al. | |
| 2004/0183249 A1 | 9/2004 | Sato | |
| 2004/0185993 A1 | 9/2004 | Doi | |
| 2005/0207812 A1 | 9/2005 | Miyazaki | |
| 2005/0210031 A1 * | 9/2005 | Kasatani | H04N 1/0096 |
| 2005/0215409 A1 | 9/2005 | Abramson et al. | |
| 2005/0232656 A1 | 10/2005 | Asai et al. | |
| 2006/0023243 A1 | 2/2006 | Asai | |
| 2006/0044601 A1 | 3/2006 | Misawa et al. | |
| 2006/0044606 A1 | 3/2006 | Yamamura | |
| 2006/0049190 A1 | 3/2006 | Middleton et al. | |
| 2006/0103065 A1 | 5/2006 | Kotani | |
| 2006/0159480 A1 | 7/2006 | Mima et al. | |
| 2006/0203289 A1 | 9/2006 | Miyata | |
| 2006/0204253 A1 | 9/2006 | Mae et al. | |
| 2006/0204269 A1 | 9/2006 | Nagata et al. | |
| 2006/0238786 A1 * | 10/2006 | Sakura | G06F 3/1285 358/1.9 |
| 2006/0262347 A1 | 11/2006 | Ono | |
| 2007/0017397 A1 * | 1/2007 | Kamata | G03G 15/6538 101/483 |
| 2007/0047997 A1 | 3/2007 | Ueda et al. | |
| 2007/0143696 A1 | 6/2007 | McComber | |

FOREIGN PATENT DOCUMENTS

| | | |
|---|---|---|
| JP | 2005-269174 A | 9/2005 |
| JP | 2006-264880 A | 5/2006 |
| JP | 2006-193288 A | 7/2006 |

* cited by examiner

FIG. 12
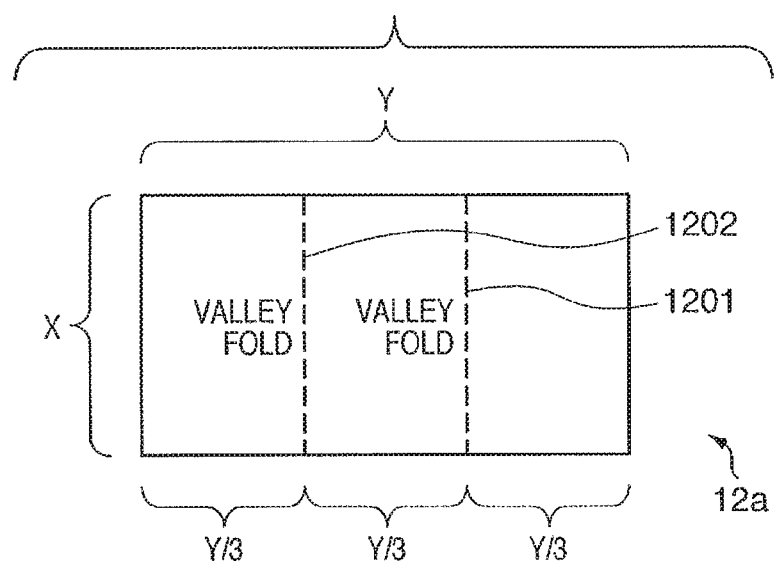
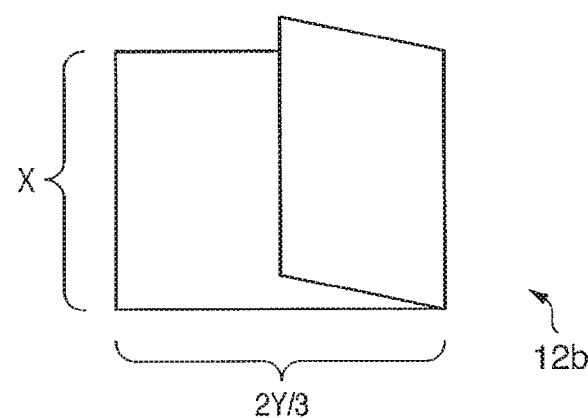
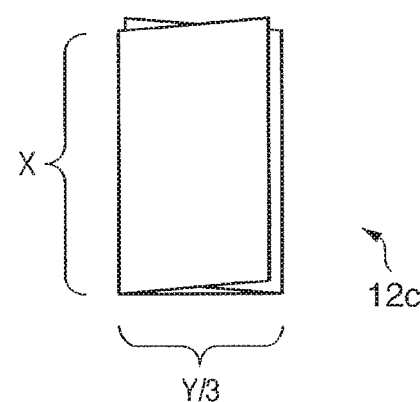

FIG. 13
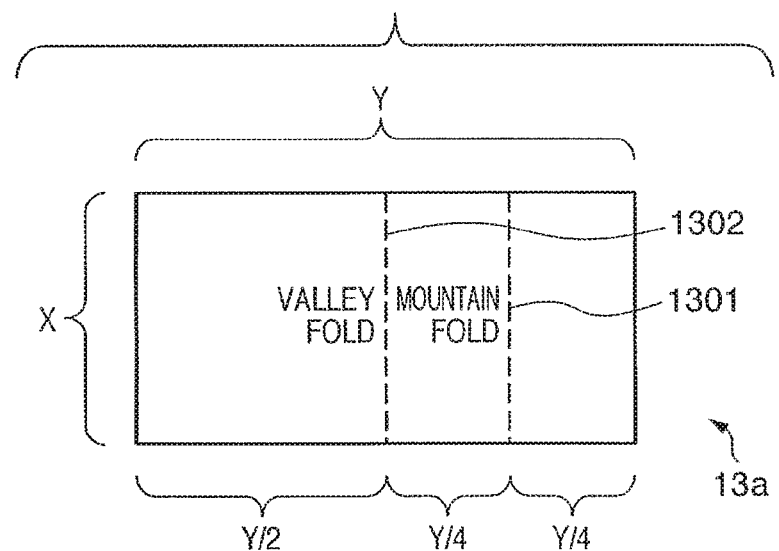
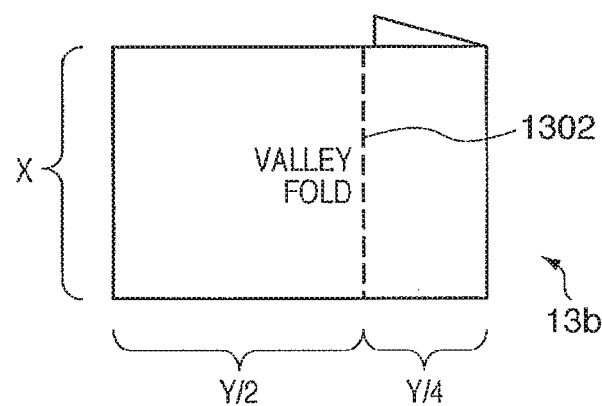
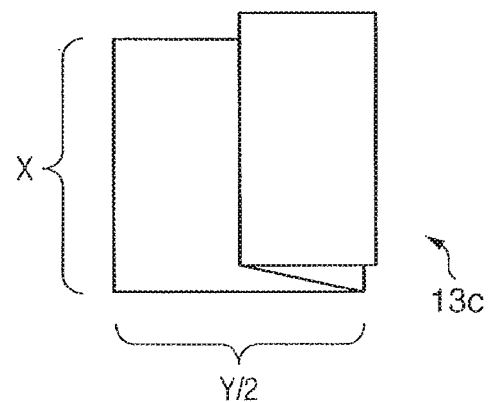

PRINTING SYSTEM CAPABLE OF PERFORMING POST-PROCESSING TO SHEETS AFTER IMAGE FORMATION AND CONTROL METHOD THEREOF

CROSS-REFERENCE TO RELATED APPLICATIONS

This application is a continuation of application Ser. No. 16/205,552, filed Nov. 30, 2018, which is a continuation of application Ser. No. 15/466,211, filed Mar. 22, 2017, which issued as U.S. Pat. No. 10,178,259 on Jan. 8, 2019, which is a continuation of application Ser. No. 15/067,817, filed Mar. 11, 2016, which issued as U.S. Pat. No. 9,641,711 on May 2, 2017, which is a continuation of application Ser. No. 14/445,677, filed Jul. 29, 2014, which issued as U.S. Pat. No. 9,311,578 on Apr. 12, 2016, which is a continuation of application Ser. No. 12/013,049, filed Jan. 11, 2008, which issued as U.S. Pat. No. 8,836,966 on Sep. 16, 2014, the entire disclosures of which is hereby incorporated by reference.

BACKGROUND OF THE INVENTION

Field of the Invention

The present invention relates to a technique of controlling post-processing after image formation.

Description of the Related Art

There has conventionally been known an image processing system which performs a variety of post-processes to sheets after image formation. For example, there is proposed a sheet folding unit which folds sheets by Z-folding (accordion folding) or C-folding (letter folding) and outputs them (Japanese Patent Laid-Open No. 2006-193288).

However, for example, the following proposal has not been made. In this situation, even a measure capable of coping with problems and needs which may arise in association with post-processing has not been proposed. For example, it is proposed to change selection of sheets subjected to image formation in accordance with the type of post-processing. For example, depending on the type of post-processing, the user may not obtain an output he wants, in a mode in which sheets of a type corresponding to an image to be formed are automatically selected.

Assume that a specific type of post-processing called C-folding is performed. Even if sheets of a type suitable for an image to be formed are selected, they may not be suited to C-folding. In this case, an output result the user does not want may be obtained. This problem arises when, for example, the user wants to execute a specific type of post-processing but print media having undergone the specific type of post-processing are different from those the user wants.

At present, there are neither proposals to solve such problems nor even requests on the market. A mechanism capable of coping with the above-mentioned problems and needs has not been examined. There is not proposed a configuration which, when the target job requires a specific type of post-processing such as C-folding, inhibits execution of print processing of the job without prompting the user to explicitly determine, via a user interface, sheets necessary for print processing of the job. Further, there is not proposed a configuration which, when the target job does not require a specific type of post-processing, permits execution of print processing of the job without prompting the user to explicitly determine, via a user interface, sheets necessary for print processing of the job.

SUMMARY OF THE INVENTION

The present invention allows realization of providing a mechanism capable of solving the above-described problems.

According to one aspect of the present invention, the foregoing problem is solved by providing a printing system capable of supplying a sheet of a job having undergone print processing by a printing unit of a printing apparatus to a post-processing unit capable of executing at least a specific type of post-processing among a plurality of types of post-processes, the system comprising a control unit configured to inhibit the printing apparatus from executing print processing of a target job without user operation for specifying a sheet necessary for the print processing by a user by using a user interface unit if the target job requires the specific type of post-processing, the control unit permitting the printing apparatus to execute print processing of the target job without the user operation if the target job does not require the specific type of post-processing.

According to another aspect of the present invention, the foregoing problem is solved by providing a method of controlling a printing system capable of supplying a sheet of a job having undergone print processing by a printing unit of a printing apparatus to a post-processing unit capable of executing at least a specific type of post-processing among a plurality of types of post-processes, the method comprising inhibiting the printing apparatus from executing print processing of a target job without user operation for specifying a sheet necessary for the print processing by a user by using a user interface unit if the target job requires the specific type of post-processing; and permitting the printing apparatus to execute print processing of the target job without the user operation if the target job does not require the specific type of post-processing.

According to still another aspect of the present invention, the foregoing problem is solved by providing a storage medium storing a computer program which causes a computer to execute a method for controlling a printing system capable of supplying a sheet of a job having undergone print processing by a printing unit of a printing apparatus to a post-processing unit capable of executing at least a specific type of post-processing among a plurality of types of post-processes, the method comprising inhibiting the printing apparatus from executing print processing of a target job without user operation for specifying a sheet necessary for the print processing by a user by using a user interface unit if the target job requires the specific type of post-processing, and permitting the printing apparatus to execute print processing of the target job without the user operation if the target job does not require the specific type of post-processing.

According to yet another aspect of the present invention, the foregoing problem is solved by providing a printing system configured to cause a printing unit to perform print processing, the system comprising a determining unit configured to determine if a target job requires a specific type of post-processing, the post-processing being performed for a sheet on which the printing process is performed by the printing unit; and a control unit configured to control a user interface unit to enable a user operation for specifying a sheet necessary for the print processing of the target job, if it is determined that the target job requires the specific type of post-processing.

Further features of the present invention will be apparent from the following description of exemplary embodiments with reference to the attached drawings.

BRIEF DESCRIPTION OF THE DRAWINGS

FIG. 12 is a view for explaining C-folding;

FIG. 13 is a view for explaining Z-folding;

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

In this specification, the term "size" not only includes the area but also includes the shape. Hence, "sizes are different" can be rewritten into "shapes and/or areas are different". In the following embodiment, "print sheet" is not limited to paper, and the present invention is applicable to any foldable "sheet". In this specification, "Z-folding" is a sheet folding style also called "accordion folding", and "C-folding" is a sheet folding style also called "letter folding". These folding styles include a method of folding a sheet completely in three at positions corresponding to ⅓ and ⅔ of the sheet width, and a method of folding a sheet at two positions corresponding to ¼ and ½ of the sheet width to obtain a half size.

Figure 1:
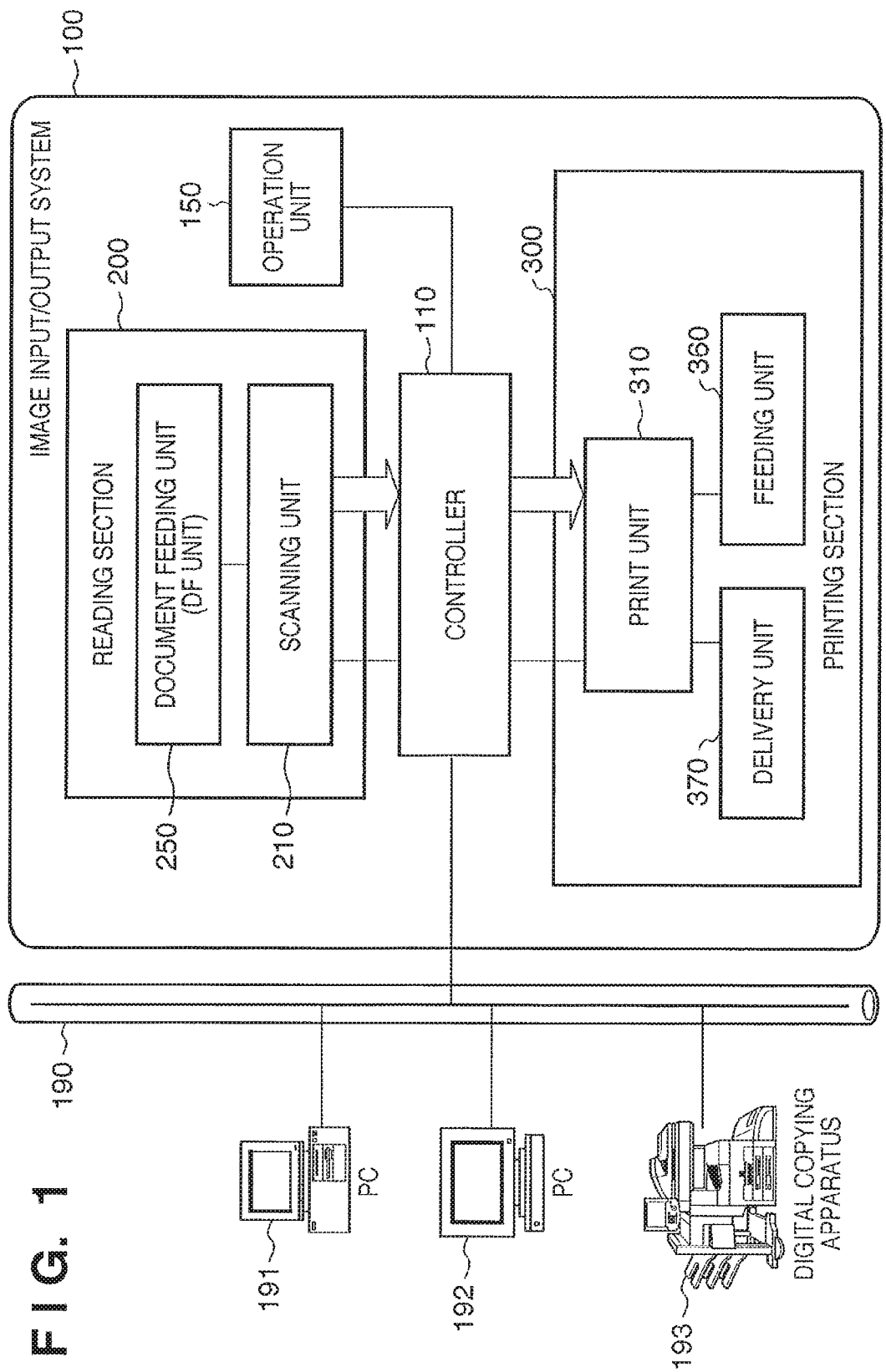
FIG. 1 is a block diagram showing an overall configuration according to an embodiment of the present invention.

An image input/output system will be described as an embodiment of an image forming apparatus according to the present invention. FIG. 1 is a block diagram showing the internal configuration of an image input/output system 100 and a peripheral arrangement to which the image input/output system 100 is applicable.

As shown in FIG. 1, the image input/output system 100 comprises a reading section 200, printing section 300, controller 110, and operation unit 150.

The reading section 200 includes a document feeding unit 250 and scanning unit 210. The document feeding unit 250 feeds a document. The scanning unit 210 scans an image on a document fed by the document feeding unit 250. Image data scanned by the scanning unit 210 is sent to the controller 110.

The printing section 300 includes a feeding unit 360, print unit 310, and delivery unit 370. The feeding unit 360 comprises a plurality of cassettes storing print sheets of different sizes, respectively. The feeding unit 360 feeds a print sheet from each cassette. The print unit 310 electrophotographically prints an image on a print sheet, and functions as an image forming means for forming an image on a sheet. The print unit 310 receives image data via the controller 110 from the scanning unit 210 or a PC (host computer) 191 or 192 connected to a LAN 190. The print unit 310 prints an image on a print sheet fed from the feeding unit 360 based on the received image data. The delivery unit 370 processes, for example, sorts or staples print sheets on which images are printed by the print unit 310, and then delivers the sheets.

The controller 110 is electrically connected to the reading section 200 and printing section 300, and is connected to the PCs 191 and 192 and a digital copying apparatus 193 via the LAN 190. When the image input/output system 100 operates as a copying machine, the controller 110 controls the reading section 200 to send image data of a read document to the printing section 300, and controls the printing section 300 to form an image on a print sheet. When the image input/output system 100 operates as a scanner, the controller 110 can also convert image data read by the reading section 200 into code data, and transmit it to the PC 191 or 192 via the LAN 190. When the image input/output system 100 operates as a printer, the controller 110 can also convert code data received from the PC 191 or 192 via the LAN 190 into image data, and cause the printing section 300 to form an image on the basis of the image data.

The operation unit 150 has a variety of keys for inputting instructions to the controller 110, and a liquid crystal display panel for displaying an interface window with the user. When the user operates any key, the operation unit 150 generates a signal corresponding to the operated key and sends it to the controller 110.

Figure 2:
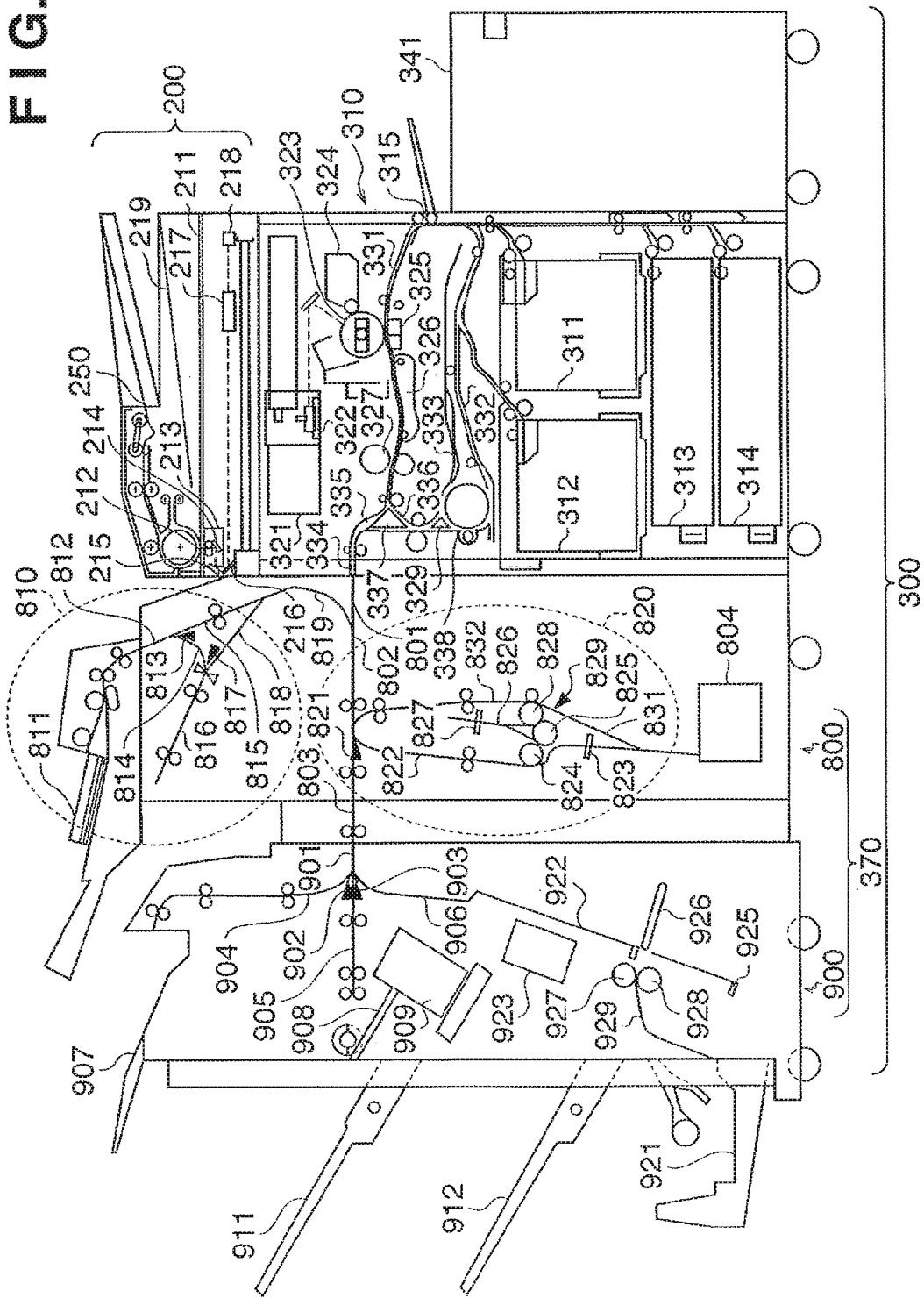
FIG. 2 is a sectional view for explaining the mechanical structure of an apparatus according to the embodiment.

The hardware configurations of the reading section 200 and printing section 300 will be explained with reference to FIG. 2. FIG. 2 is a schematic view showing the hardware configurations of the reading section 200 and printing section 300.

The reading section 200 and printing section 300 are configured as shown in FIG. 2. The printing section 300 is connected to a deck unit 341, a C/Z-folding unit 800 serving as a sheet folding unit, and a finisher 900. The C/Z-folding unit 800 and finisher 900 constitute the delivery unit 370, and function as a post-processing means for performing a plurality of types of post-processes to sheets after image formation.

The image reader, print unit, C/Z-folding unit, and finisher will be described.

<Reading Section>

The reading section 200 comprises the document feeding unit 250. The document feeding unit 250 feeds document sheets one by one sequentially from the first sheet onto a platen glass 211. Every time the reading operation of each document sheet ends, the document sheet is discharged from the platen glass 211 onto a discharge tray 219. In the reading section 200, after a document sheet is fed onto the platen glass 211, a lamp 212 is turned on, and a scanning box 213 starts moving. As the scanning box 213 moves, the document sheet on the platen glass 211 is read and scanned. During read scanning, reflected light from the document sheet is guided to a CCD image sensor (to be referred to as a CCD hereinafter) 218 via mirrors 214, 215, and 216 and a lens 217. The image on the document sheet is formed on the image sensing plane of the CCD 218. The CCD 218 converts the image formed on the image sensing plane into an electrical signal, and sends the electrical signal as image data to the controller 110.

<Printing Section>

The printing section 300 comprises a laser driver 321. The laser driver 321 drives a laser emitting portion 322 based on image data sent from the controller 110. The laser emitting portion 322 emits a laser beam corresponding to image data. The laser beam is reflected by a rotary polygon mirror (not shown) and scans the surface of a photosensitive drum 323. An electrostatic latent image corresponding to the emitted laser beam is formed on the surface of the photosensitive drum 323. The electrostatic latent image on the photosensitive drum 323 is visualized as a toner image with toner supplied from a developing unit 324. In synchronism with the laser beam irradiation timing, a print sheet is fed between the photosensitive drum 323 and a transfer portion 325 via a conveyance path 331 from a cassette 311, 312, 313, or 314, a manual feed stage 315, or the deck unit 341. The toner image on the photosensitive drum 323 is transferred onto the fed print sheet at the transfer portion 325.

The print sheet bearing the toner image is sent to a fixing portion 327 by a conveyance belt 326. The fixing portion 327 thermally presses the print sheet to fix the toner image on the print sheet onto it. The print sheet having passed through the fixing portion 327 is sent from a delivery port 334 into the C/Z-folding unit 800 via a conveyance path 335. As the delivery unit 370 for print sheets, a delivery bin can also be attached outside the delivery port 334, instead of the C/Z-folding unit 800 and finisher 900. Print sheets can be discharged to the delivery bin. To send a print sheet to the C/Z-folding unit after reversing the print surface, the print sheet is temporarily guided from a conveyance path 336 to a conveyance path 338 via a flapper 329, and then sent from the delivery port 334 to the C/Z-folding unit via a conveyance path 337. When the two-sided printing mode is set, a print sheet having passed through the fixing portion 327 is guided to the conveyance path 336, temporarily guided to a conveyance path 333 via the flapper 329, and then guided to a conveyance path 332 via the conveyance path 338. The print sheet guided to the conveyance path 332 is fed again between the photosensitive drum 323 and the transfer portion 325, and a toner image is transferred onto the unprinted surface of the print sheet.

<C/Z-Folding Unit>

The C/Z-folding unit 800 includes an inserter unit 810, C/Z-folding unit 820, and C-folded sheet delivery port 804. The inserter unit 810 feeds a printed sheet and inserts it into a desired position between print sheets output from the print unit 310.

The inserter unit 810 feeds a sheet set on an inserter feeding stage 811 into a conveyance path 812. A flapper 813 sends a print sheet on the conveyance path 812 to conveyance paths 815 and 819, and guides it to a conveyance path 802. Also, the flapper 813 sends a sheet fed from the inserter feeding stage 811 to conveyance paths 814 and 816. Then, the sheet is reversely fed. After the sheet set on the inserter feeding stage 811 is reversed (turned over), it can be sent to the conveyance path 819.

The C/Z-folding unit 820 can execute the following three types of processes to a sheet fed from the inserter unit and a sheet sent from the print unit:

1. pass-through mode, 2. C-folding mode, and 3. Z-folding mode.

In the "pass-through mode" out of these modes, a sheet is sent to a subsequent unit without C- or Z-folding the sheet. A sheet having passed through the conveyance path 802 is sent to the finisher 900 via a conveyance path 803.

The "C-folding mode" and "Z-folding mode" by the C/Z-folding unit 820 will be explained with reference to FIGS. 8 to 13. FIGS. 8 to 11 are sectional views showing the C/Z-folding unit 820 in detail. FIG. 12 shows procedures to fold a sheet 840 in the C-folding mode. Similarly, FIG. 13 shows procedures to fold a sheet 850 in the Z-folding mode.

Figure 8:
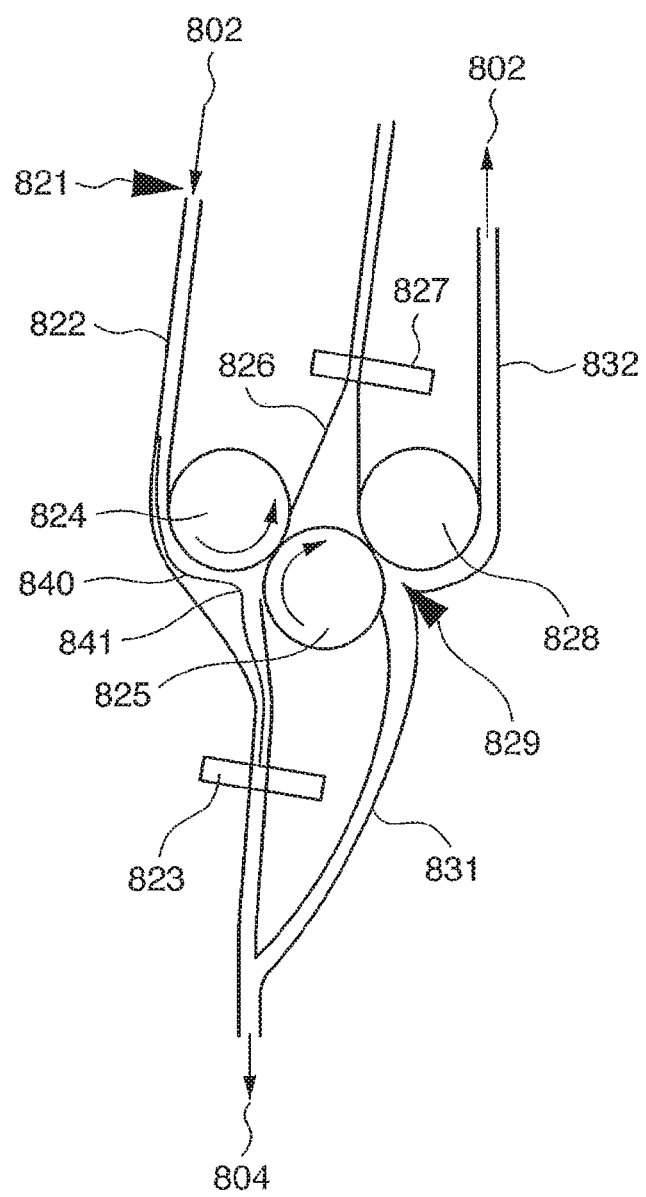
FIG. 8 is a sectional view for explaining in detail C-folding by a C/Z-folding unit.

In the "C-folding mode", the sheet 840 conveyed to the C/Z-folding unit 820 via the conveyance path 802 is folded by a folding style called "C-folding", and discharged to the C-folded sheet delivery port 804. If the user designates the "C-folding mode" on the operation unit 150, a flapper 821 operates to guide the sheet 840 from the conveyance path 802 to a conveyance path 822, as shown in FIG. 8. When the leading end of the sheet 840 hits a stopper 823, a formed loop 841 of the sheet 840 is nipped between folding rollers 824 and 825.

Then, the sheet 840 (print sheet size of X×Y) shown in 12a of FIG. 12 is folded once at a position 1201, as shown in 12b of FIG. 12. The stopper 823 is arranged at a position where the distance from the nip becomes ⅔ of the sheet 840 in the Y direction.

Figure 9:
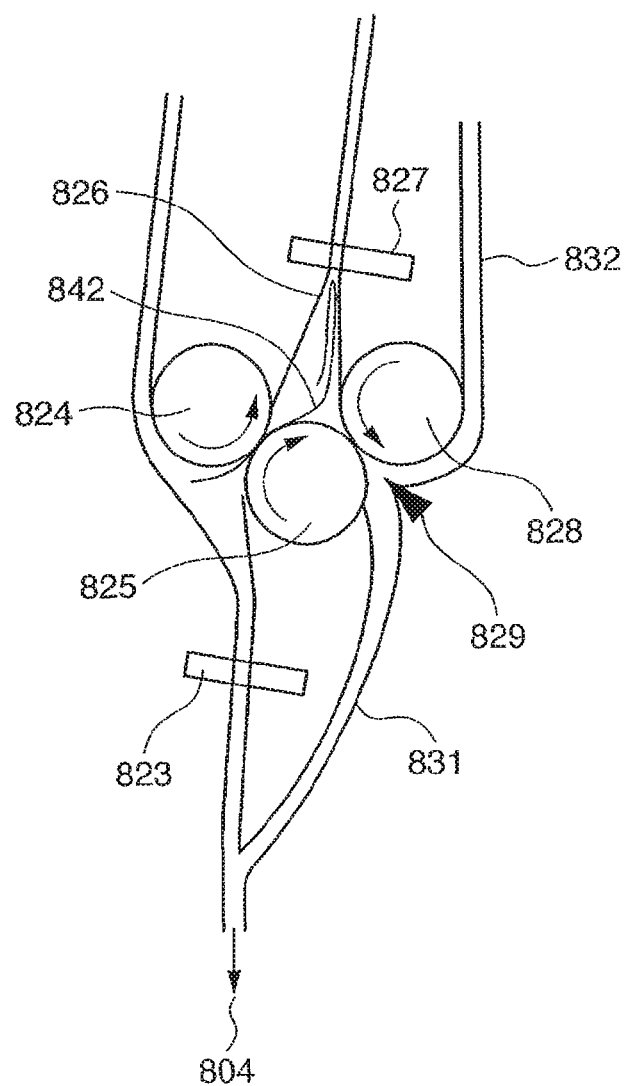
FIG. 9 is a sectional view for explaining in detail C-folding by the C/Z-folding unit.

The sheet 840 folded once is guided to a conveyance path 826. When the sheet 840 hits a stopper 827, a formed loop 842 of the sheet 840 is nipped between the folding roller 825 and a folding roller 828 (FIG. 9).

The sheet 840 in 12b of FIG. 12 is folded again, and as a result, folded twice as shown in 12c of FIG. 12. The stopper 827 is arranged at a position where the distance from the nip between the rollers 825 and 828 becomes ⅓ of the sheet 840. The sheet 840 folded twice passes through a conveyance path 831 via a flapper 829, and is delivered to the C-folded sheet delivery port 804.

Figure 10:
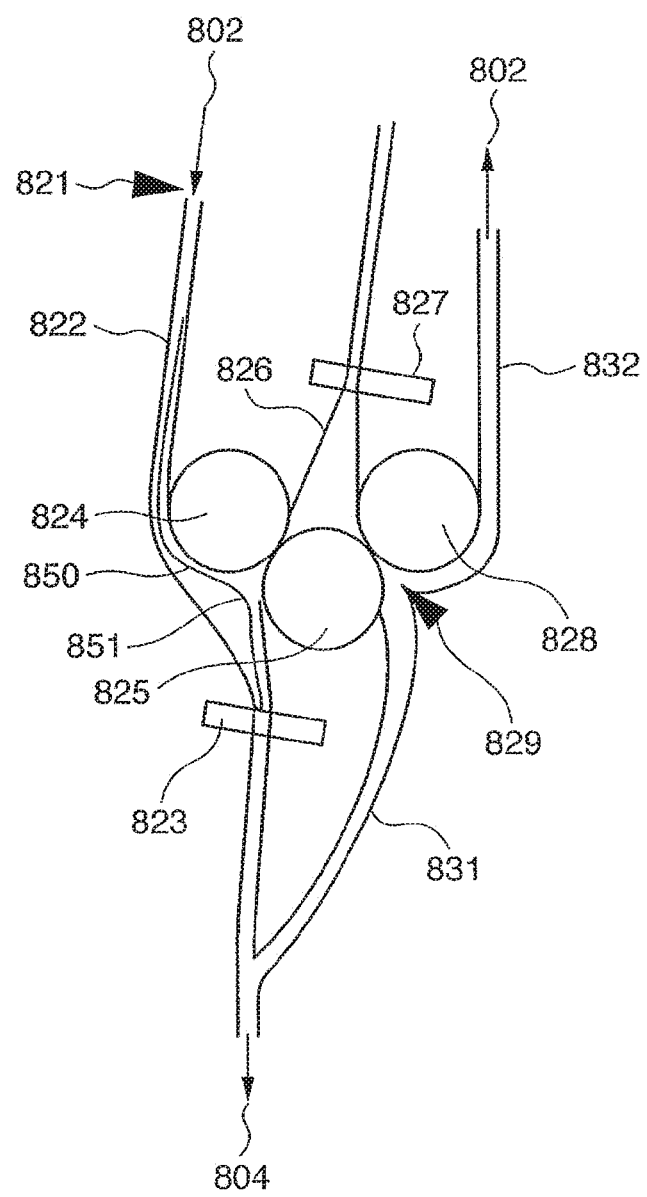
FIG. 10 is a sectional view for explaining in detail Z-folding by the C/Z-folding unit.

In the "Z-folding mode", a sheet conveyed via the conveyance path 802 is folded by a folding style called "Z-folding", and returned to the conveyance path 802. If the user designates the "Z-folding mode" on the operation unit 150, the flapper 821 operates to guide the sheet 850 from the conveyance path 802 to the conveyance path 822, as shown in FIG. 10. When the leading end of the sheet 850 hits the stopper 823, a formed loop 851 of the sheet 850 is nipped between the folding rollers 824 and 825.

Then, the sheet 850 (print sheet size of X×Y) shown in 13a of FIG. 13 is folded once at a position 1301, as shown in 13b of FIG. 13. The stopper 823 is arranged at a position where the distance from the nip becomes ¼ of the sheet 850 in the Y direction.

Figure 11:
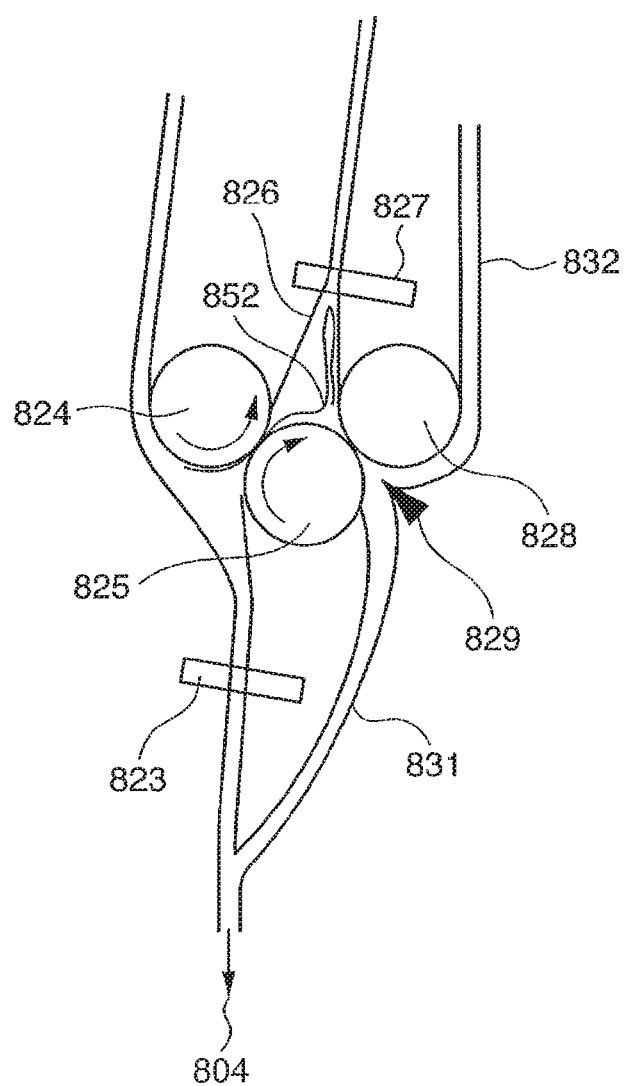
FIG. 11 is a sectional view for explaining in detail Z-folding by the C/Z-folding unit.

The sheet 850 folded once is guided to the conveyance path 826. When the sheet 850 hits the stopper 827, a formed loop 852 of the sheet 850 is nipped between the folding rollers 825 and 828 (FIG. 11).

The sheet 850 in 13b of FIG. 13 is folded again at a position 1302, and as a result, folded twice as shown in 13c of FIG. 13. At this time, the stopper 827 is arranged at a position where the length from the fold formed by the rollers 824 and 825 to the loop 852 becomes ¼ of the sheet 850. The sheet 850 folded twice returns from a conveyance path 832 to the conveyance path 802 via the flapper 829. After that, the sheet 850 is sent to the finisher 900 via the conveyance path 803.

<Finisher>

Referring back to FIG. 2, the finisher 900 includes a sample tray 907, stack trays 911 and 912, and a booklet tray 921. The finisher 900 can perform processing such as stapling, sorting, offset, or bookbinding, and deliver processed sheets.

When outputting a sheet to the sample tray 907, a sheet coming into a conveyance path 901 is delivered to the sample tray 907 by flappers 902 and 903 via a conveyance path 904.

When outputting a sheet to the stack tray 911 or 912, the following operation is done. A sheet coming into the conveyance path 901 is guided to a conveyance path 905 by the flappers 902 and 903 and delivered to the stack tray 911. The stack trays 911 and 912 are vertically movable. When outputting a sheet to the stack tray 912, the stack tray 912 moves up. When outputting sheets to the stack tray 911 or 912, for example, sheets can also be sorted, offset, or stapled by a stapler 909 via an intermediate tray 908.

When outputting sheets to the booklet tray 921, sheets coming into the conveyance path 901 are guided to a conveyance path 906 via the flappers 902 and 903, and stay at an abutment portion 925. In saddle-stitching, sheets are saddle-stitched by a stapler 923 at the position of an intermediate tray 922. The saddle-stitched sheet bundle is moved to the abutment portion 925. A push member 926 and rollers 927 and 928 are arranged near the abutment portion 925. The push member 926 pushes out toward the sheet bundle at the abutment portion 925. Then, the sheet bundle is pushed out between the rollers 927 and 928, and folded by them. The sheet bundle is delivered to the booklet tray 921 via a conveyance path 929.

<Controller>

The functions of the controller 110 will be described with reference to the block diagram of FIG. 3. A main controller 111 comprises a CPU (processor) 112, a bus controller 113, and a variety of I/F controller circuits (not shown).

The CPU 112 and bus controller 113 control the operation of the whole controller 110. The CPU 112 operates based on a program loaded from a ROM 114 via a ROM I/F 115. This program also describes an operation to interpret PDL (Page Description Language) code data received from a host computer and rasterize it into raster image data. This operation is processed by software. The bus controller 113 controls transfer of data input/output from/to I/Fs, and performs arbitration of bus conflict and control of DMA data transfer.

A DRAM 116 is connected to the main controller 111 via a DRAM I/F 117, and serves as a work area for the operation of the CPU 112 and an area for accumulating image data.

A Codec 118 compresses raster image data accumulated in the DRAM 116 by a format such as MH/MR/MMR/JBIG/JPEG, and decompresses compressed/accumulated code data into raster image data. An SRAM 119 serves as a temporary work area for the Codec 118. The Codec 118 is connected to the main controller 111 via an I/F 120. The bus controller 113 controls DMA transfer between the Codec 118 and the DRAM 116.

A graphic engine 135 performs image rotation, image scaling, color space conversion, and binarization to raster image data accumulated in the DRAM 116. An SRAM 136 serves as a temporary work area for the graphic engine 135. The graphic engine 135 is connected to the main controller 111 via an I/F. The bus controller 113 controls DMA transfer between the graphic engine 135 and the DRAM 116.

A network controller 121 is connected to the main controller 111 via an I/F 123, and to an external network via a connector 122. A general example of the network is Ethernet®.

A general-purpose high-speed bus 125 connects an I/O controller 126 to an expansion connector 124 for connecting an expansion board. A general example of the general-purpose high-speed bus is a PCI bus. According to the embodiment, a control board for controlling the finisher 900 and C/Z-folding unit 800 is connected to the expansion connector 124. That is, the main controller 111 controls the finisher 900 and C/Z-folding unit 800 via the expansion connector 124 and the expansion board (not shown).

The I/O controller 126 comprises asynchronous serial communication controllers 127 of two channels for transmitting/receiving control commands to/from the CPUs of the reading section 200 and printing section 300. An I/O bus 128 connects the asynchronous serial communication controllers 127 to a scanner I/F 140 and printer I/F 145.

A panel I/F 132 is connected to an LCD controller 131. The panel I/F 132 comprises an I/F for display on the liquid crystal display of the operation unit 150 and a key input I/F 130 for inputs from hard keys and touch panel keys.

The operation unit 150 comprises a liquid crystal display, a touch panel adhered onto the liquid crystal display, and a plurality of hard keys. A signal input from the touch panel or hard key is transferred to the CPU 112 via the panel I/F 132. The liquid crystal display displays image data sent from the panel I/F 132. The liquid crystal display displays the functions of the apparatus, image data, and the like.

A real-time clock module 133 updates and saves a date and time managed inside the apparatus, and is backed up by a backup battery 134.

An E-IDE connector 161 connects an external storage device. A hard disk drive 160 is connected to the connector 161, and performs an operation to store image data in a hard disk 162 or read out image data from the hard disk 162.

Connectors 142 and 147 are respectively connected to the reading section 200 and printing section 300. The connector 142 includes an asynchronous serial I/F 143 and video I/F 144. The connector 147 includes an asynchronous serial I/F 148 and video I/F 149.

The scanner I/F 140 is connected to the reading section 200 via the connector 142. The scanner I/F 140 is also connected to the main controller 111 via a scanning unit bus 141. The scanner I/F 140 has a function of processing an image received from the reading section 200. The scanner I/F 140 also has a function of outputting, to the scanning unit bus 141, a control signal generated based on a video control signal sent from the reading section 200. The bus controller 113 controls data transfer from the scanning unit bus 141 to the DRAM 116.

A printer I/F 145 is connected to the printing section 300 via the connector 147. The printer I/F 145 is connected to the main controller 111 via a printer bus 146. The printer I/F 145 has a function of processing image data output from the main controller 111, and outputting the processed image data to the printing section 300. The printer I/F 145 also has a function of outputting, to the printer bus 146, a control signal generated based on a video control signal sent from the printing section 300.

The bus controller 113 controls transfer of raster image data rasterized in the DRAM 116 to the printer. The raster image data is DMA-transferred to the printing section 300 via the printer bus 146 and video I/F 149.

<Operation Unit>

Figure 4:
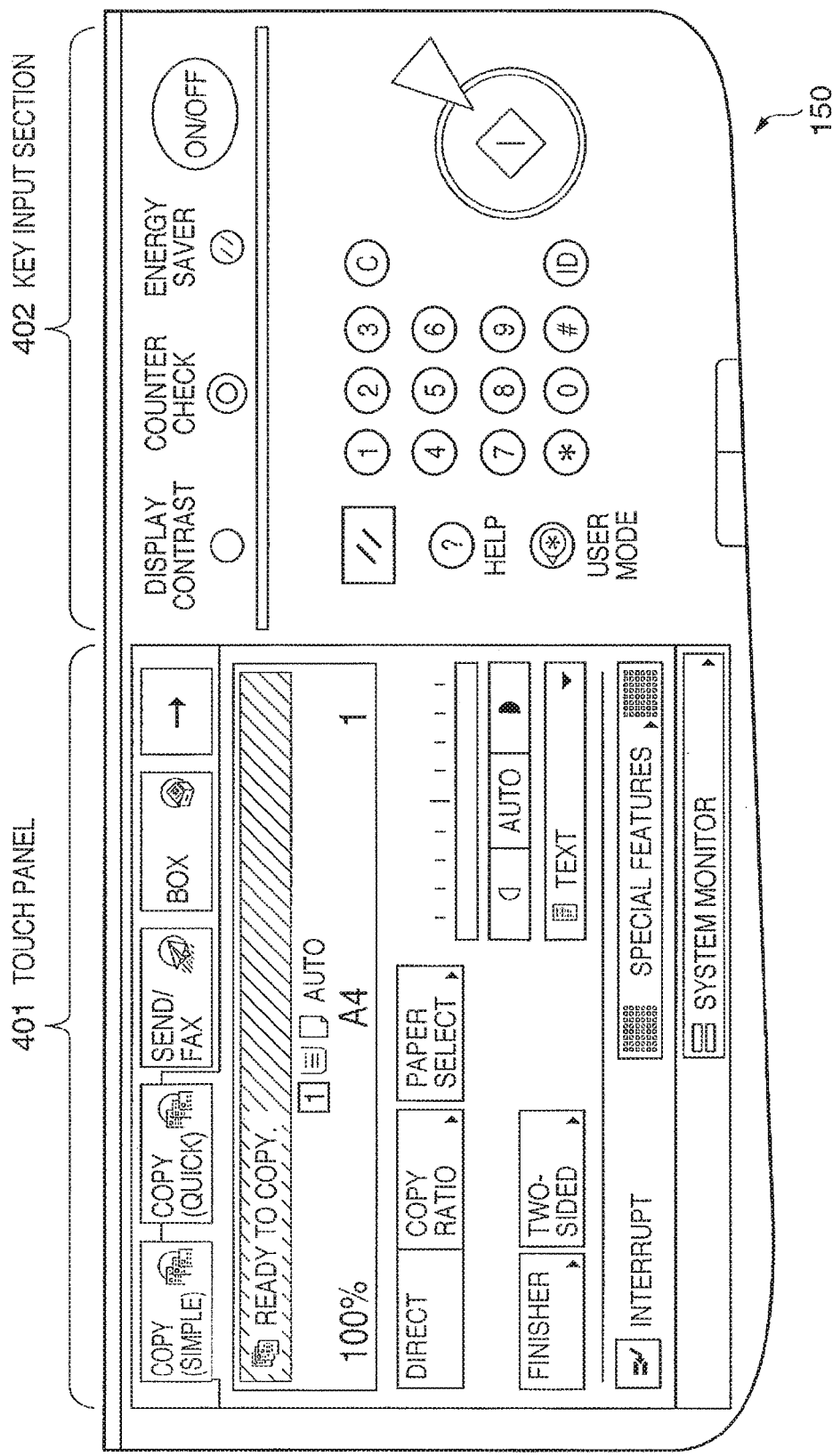
FIG. 4 is a view for explaining the arrangement of an operation unit.

FIG. 4 is a view showing the outer appearance of the operation unit 150. The operation unit 150 comprises a key input section 402 and touch panel 401. The key input section 402 can accept a user operation with hard keys. The touch panel 401 serves as an example of a display unit capable of accepting a user operation with soft keys (display keys).

Figure 5:
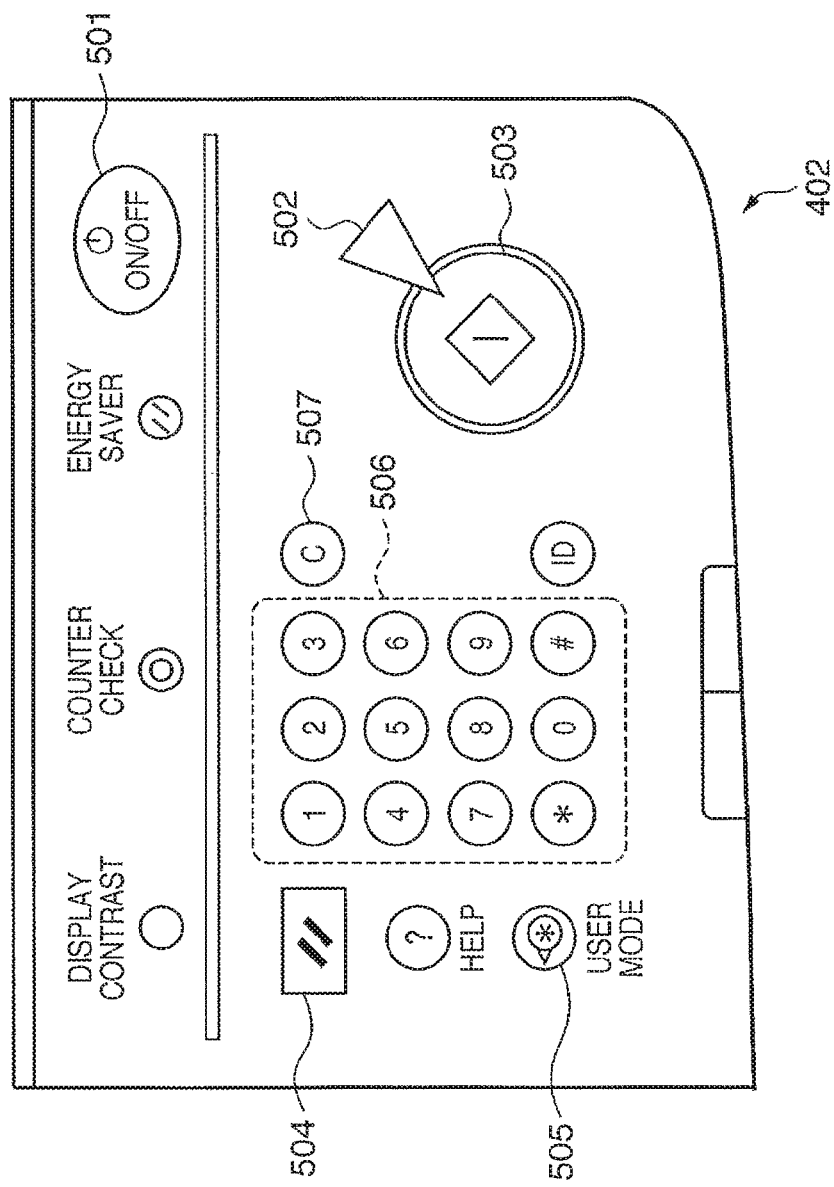
FIG. 5 is a view for explaining the key input section of the operation unit.

FIG. 5 is a view showing the arrangement of the key input section 402 in detail. The key input section 402 includes a power switch 501. In response to a user operation to the power switch 501, the controller 110 controls to switch between the standby mode (normal operation state) and the sleep mode (state in which the program stops in wait for an interrupt in preparation for network printing, facsimile transmission, or the like, suppressing power consumption). The controller 110 controls to accept an operation to the power switch 501 while a main power switch (not shown) for supplying power to the whole system is ON.

A start key 503 is used to accept an instruction from the user to start a kind of job processing designated by the user, such as copying or transmission of a target job. A stop key 502 is used to accept an instruction from the user to interrupt the processing of an accepted job. A ten-key pad 506 is used to accept input of numerical values from the user during various settings. A clear key 507 is used to accept an instruction from the user to clear various parameters input by him via the ten-key pad 506 or the like. A reset key 504 is used to accept an instruction from the user to invalidate various settings temporarily made for a target job and restore the setting values to default values. A user mode key 505 is used to accept an instruction to shift a window displayed on the touch panel 401 to a system setup window for each user.

Figure 6:
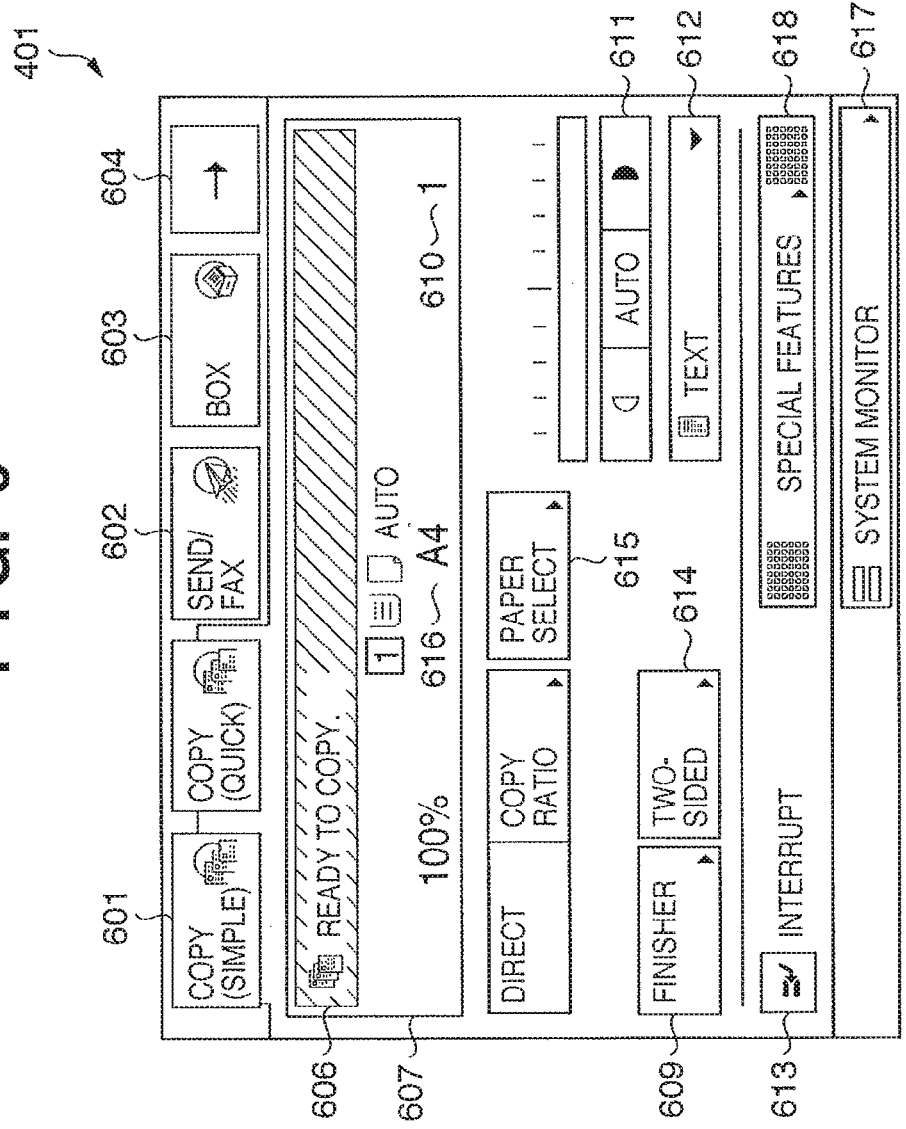
FIG. 6 is a view for explaining a display control example on a touch panel section at the start of processing.

The arrangement of a window displayed on the touch panel 401 will be explained in more detail with reference to FIGS. 6 and 7. FIG. 6 shows a window displayed on the touch panel 401 under the control of the controller 110 when the user selects (touches) a copy tab 601. When the user selects a send tab 602, the controller 110 causes the touch panel 401 to display the operation window of the data send function (e.g., FAX transmission or E-mail sending). When the user selects a box tab 603, the controller 110 causes the touch panel 401 to display the operation window of the box function.

The box function uses a plurality of data storage boxes (to be referred to boxes hereinafter) which are virtually ensured in the hard disk 162. The plurality of boxes can be used separately by respective users. For example, the controller 110 frees a memory area of the hard disk 162 that corresponds to a box selected from a plurality of boxes by the user by operating the touch panel 401. The controller 110 stores acquired image data in the free memory area. For example, in response to an instruction input from the user via the operation unit 150, the controller 110 controls to store, in a box selected by the user, document data of a job accepted from the scanning unit 210. For example, text data of a job accepted from an external apparatus (e.g., the PC 191 or 192) via the network controller 121 can also be stored in a box designated by the user in accordance with a user instruction input via the user interface of the external apparatus.

When the user inputs an instruction from the operation unit 150 to output job data stored in a box, the controller 110 reads out the designated data from a memory area of the hard disk 162 that corresponds to the designated box. Then, the controller 110 controls respective units of the apparatus to output the data in a form designated by the user. For example, the controller 110 controls the printing section 300 to print out designated data, or controls the network controller 121 to transmit the data to an external apparatus.

When the user selects an option tab 604 on the touch panel 401 in FIG. 6, the controller 110 causes the touch panel 401 to display a window for setting optional functions such as scanning setting. When the user selects a system monitor key 617, the controller 110 causes the touch panel 401 to display a display window for notifying the user of the MFP state or status.

When the user selects a two-sided printing key 614, the controller 110 causes the touch panel 401 to display a window which allows the user to set which of single-sided printing and two-sided printing is executed to print a target job. In response to selection of a print paper selection key 615 by the user, the controller 110 causes the touch panel 401 to display a window which allows the user to set a feeding unit, sheet size, and sheet type (medium type) necessary to print a target job. In response to selection of a key 612, the controller 110 causes the touch panel 401 to display a window which allows the user to select an image processing mode (e.g., text mode or photo mode) suited to a document image. When the user operates a density setting key 611, the controller 110 allows him to adjust the density of the output image of a print job.

The controller 110 causes the touch panel 401 to display, in a status display field 606, the operation state (e.g., standby, warm-up, printing, jam, or error) of an event which occurs. The controller 110 causes the touch panel 401 to display information in a display field 607 for prompting the user to confirm the copy ratio of a target job. The controller 110 causes the touch panel 401 to display information in a display field 616 for prompting the user to confirm the sheet size and feeding mode of a target job. The controller 110 causes the touch panel 401 to display, in a display field 610, information for prompting the user to confirm the number of copies of a target job, and information for prompting the user to confirm the sheet number during printing. In this manner, the controller 110 causes the touch panel 401 to display various kinds of information to be announced to the user.

When the user selects an interrupt key 613, the controller 110 stops a job during printing, and allows executing printing of a job designated by the user. When the user selects a "special features" key 618, the controller 110 causes the touch panel 401 to display a window for special print settings such as various image processes and layouts including two-page separation, cover/sheet insertion, image combination, image movement, and bookbinding.

Figure 7:
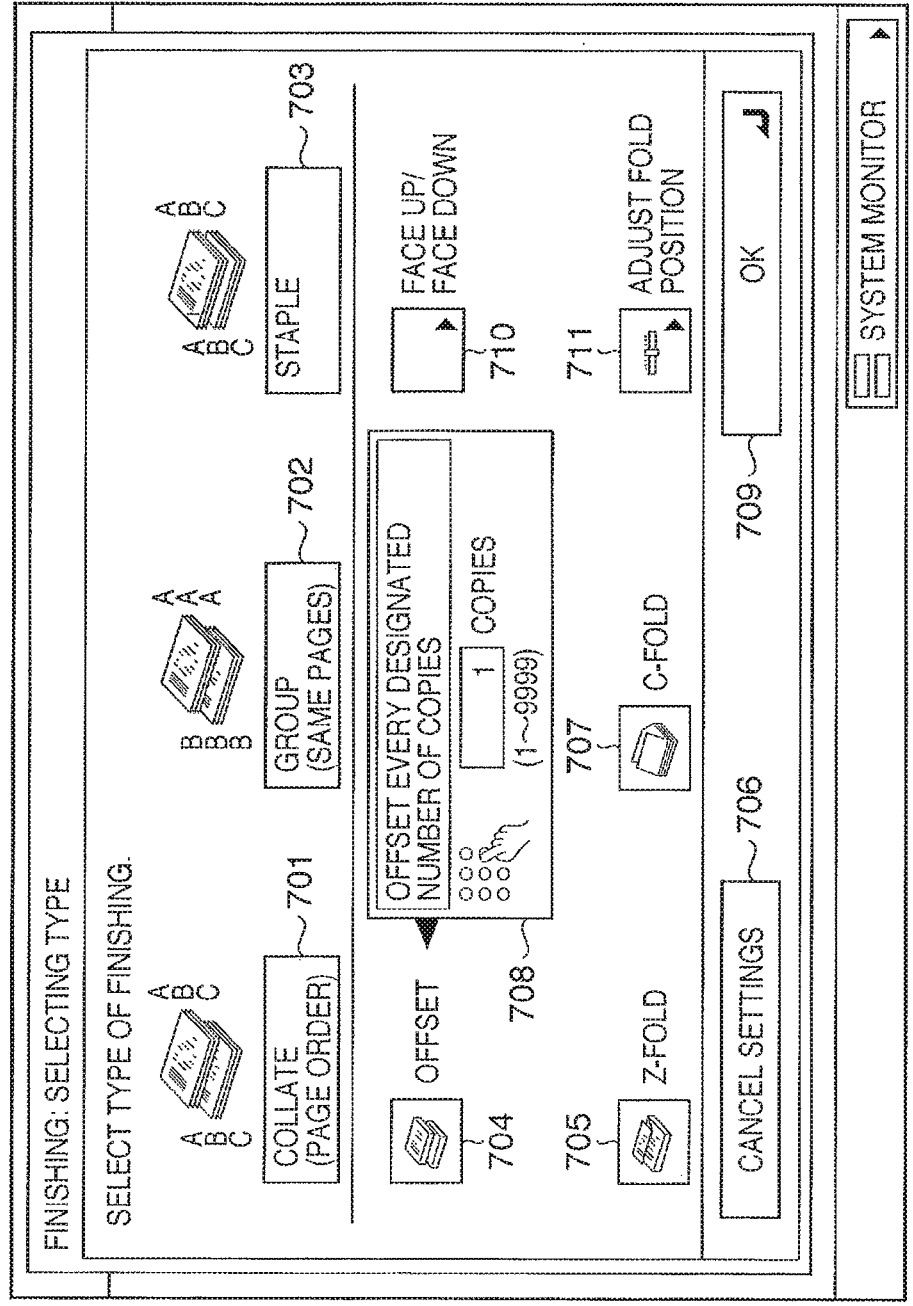
FIG. 7 is a view for explaining a display control example on the touch panel section when the finishing function is set.

FIG. 7 shows a window displayed on the touch panel 401 when the user selects a finishing key 609 in the window of FIG. 6. This window allows the user to set sheet processing such as stapling, folding, and offset. Keys 701 to 705 and 707 are used to designate different finishing methods, and a selected key changes in color. If the user selects an OK key 709 while the color of the selected key changes, the controller 110 stores a setting corresponding to the key selected upon selecting the OK key, and uses the setting in printing.

The collate (sort) key 701 is used to collate sheets of each copy in the page order. The group key 702 is used to group sheets of each page. The staple key 703 is used to set stapling. The keys 701 to 703 can be set not simultaneously but only exclusively. The Z-folding key 705 to set Z-folding, and the C-folding key 707 to set C-folding are also exclusive. For an impossible combination, like a combination of stapling and C-folding, when the staple key 703 is selected, the C-folding key 707 is grayed out and cannot be selected. When the C-folding key 707 is selected first, the staple key 703 cannot be selected. In this way, when settings cannot be combined, either corresponding key cannot be selected.

The offset key 704 is used to make a setting of offsetting the output position every designated number of copies. The controller 110 controls the finisher 900 to offset the output position every number of copies that is input to a copy count input field 708.

When the user selects a face-up/face-down designation key 710, the controller 110 causes the touch panel 401 to display a window which allows the user to designate face-up delivery or face-down delivery. When the user selects a fold position adjustment key 711, the controller 110 causes the touch panel 401 to display a window which allows the user to adjust the parameter of the fold position in Z-folding or C-folding. If the user selects a setting cancel button 706, the window in FIG. 7 returns to one in FIG. 6 without reflecting contents set in the window of FIG. 7. If the user selects the OK key 709, the window in FIG. 7 returns to one in FIG. 6 after reflecting contents set in the window of FIG. 7.

Figure 3:
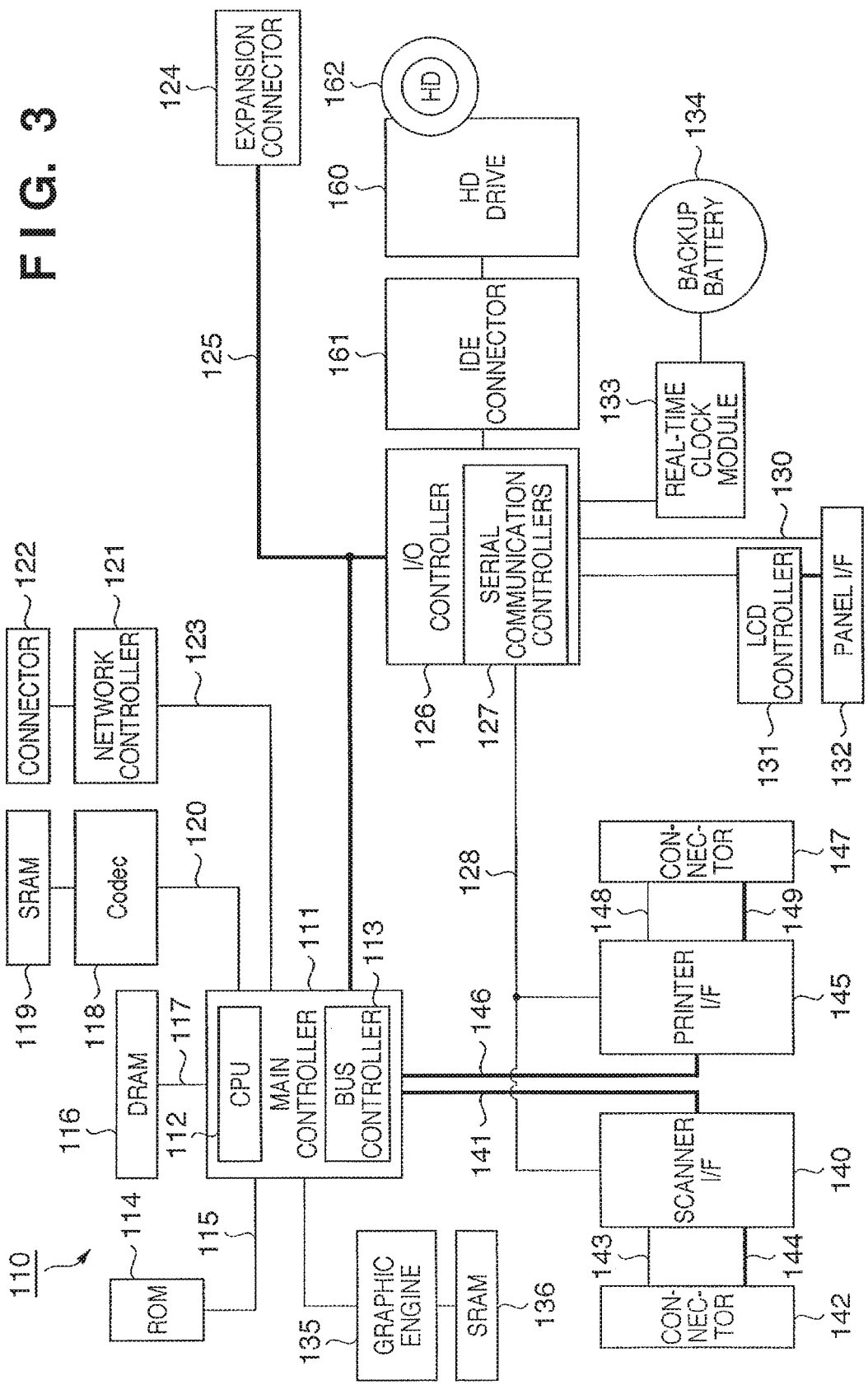
FIG. 3 is a block diagram for explaining the configuration of a controller.

Various settings made by these key operations are stored as print settings in the DRAM 116 in FIG. 3. At the start of printing by selecting the start key 503, these settings are read out from the DRAM 116 and used for control.

Figure 14:
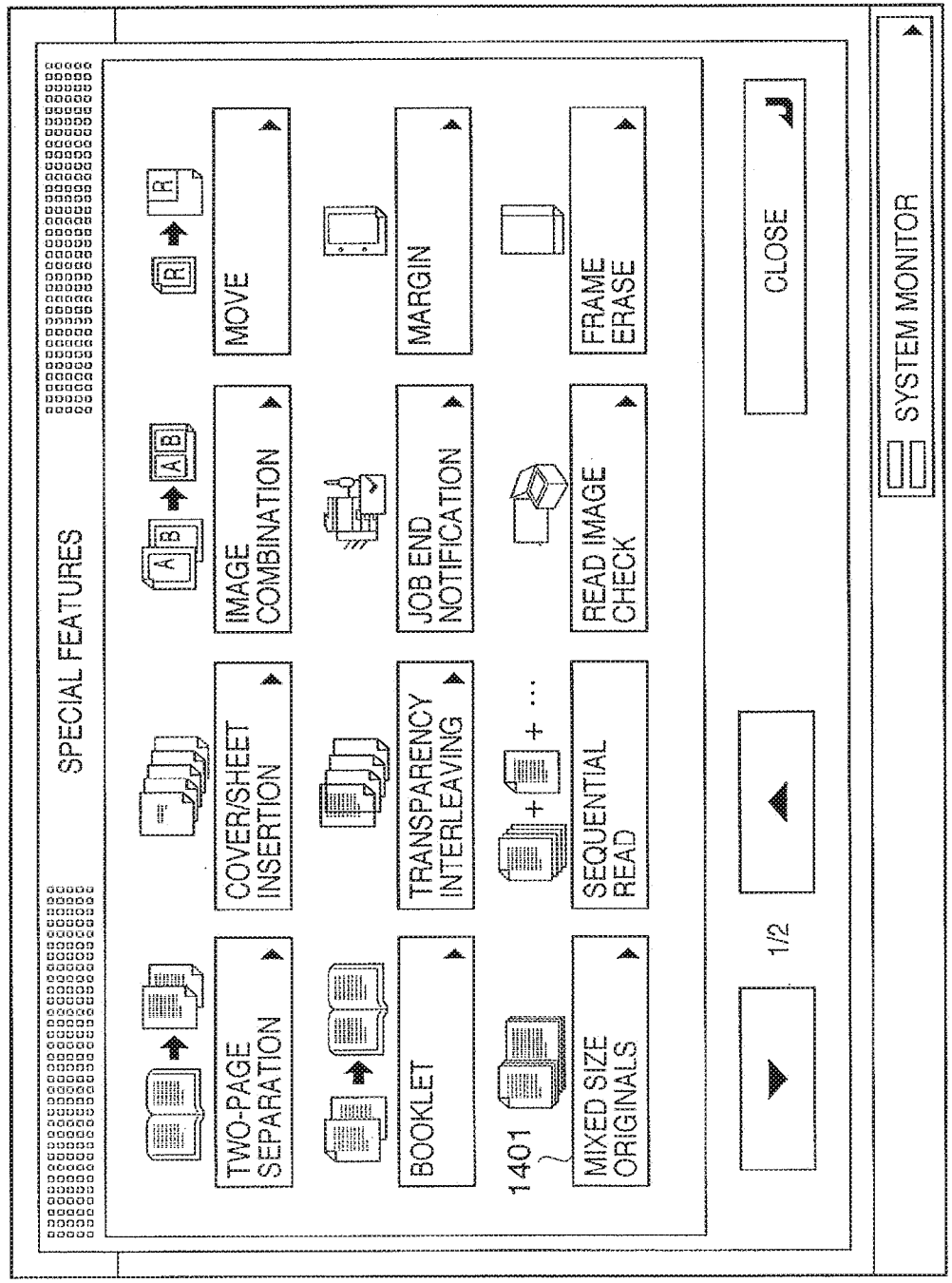
FIG. 14 is a view for explaining a display control example on the touch panel section when special features are selected.

FIG. 14 is a view showing a window displayed on the touch panel 401 when the user selects the "special features" key 618 in FIG. 6. This window allows the user to set various image processes and layouts including two-page separation, cover/sheet insertion, image combination, image movement, and bookbinding.

Figure 15:
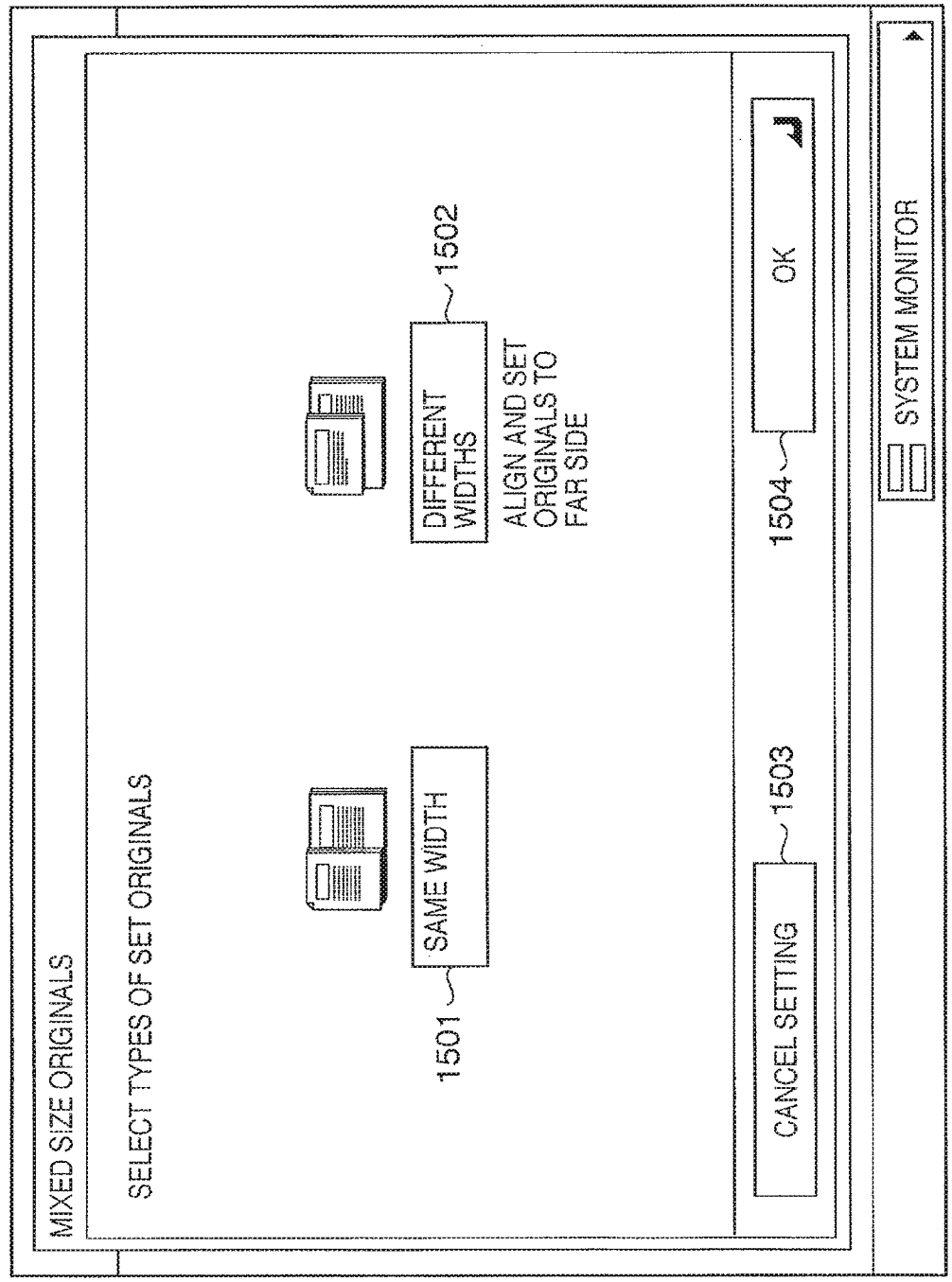
FIG. 15 is a view for explaining a display control example on the touch panel section when mixed size originals are set.

When the user selects a "mixed size originals" key 1401, the controller 110 causes the touch panel 401 to display a window shown in FIG. 15 for an advanced setting for mixed size originals. In FIG. 15, the user can set whether the widths of set original sheets are equal or different. When the user selects a "same width" key 1501, the controller 110 determines that a plurality of original sheets set on the document feeding unit 250 have the same width. When the user selects a "different width" key 1502, the controller 110 determines that a plurality of set original sheets have different widths. After the start of reading, original sheets are scanned based on the determination of the key. When the user selects a setting cancel key 1503, the setting of mixed size originals is canceled, and the window in FIG. 15 returns to one in FIG. 14. When the user selects an OK key 1504, the advanced setting of mixed size originals is determined.

Figure 16:
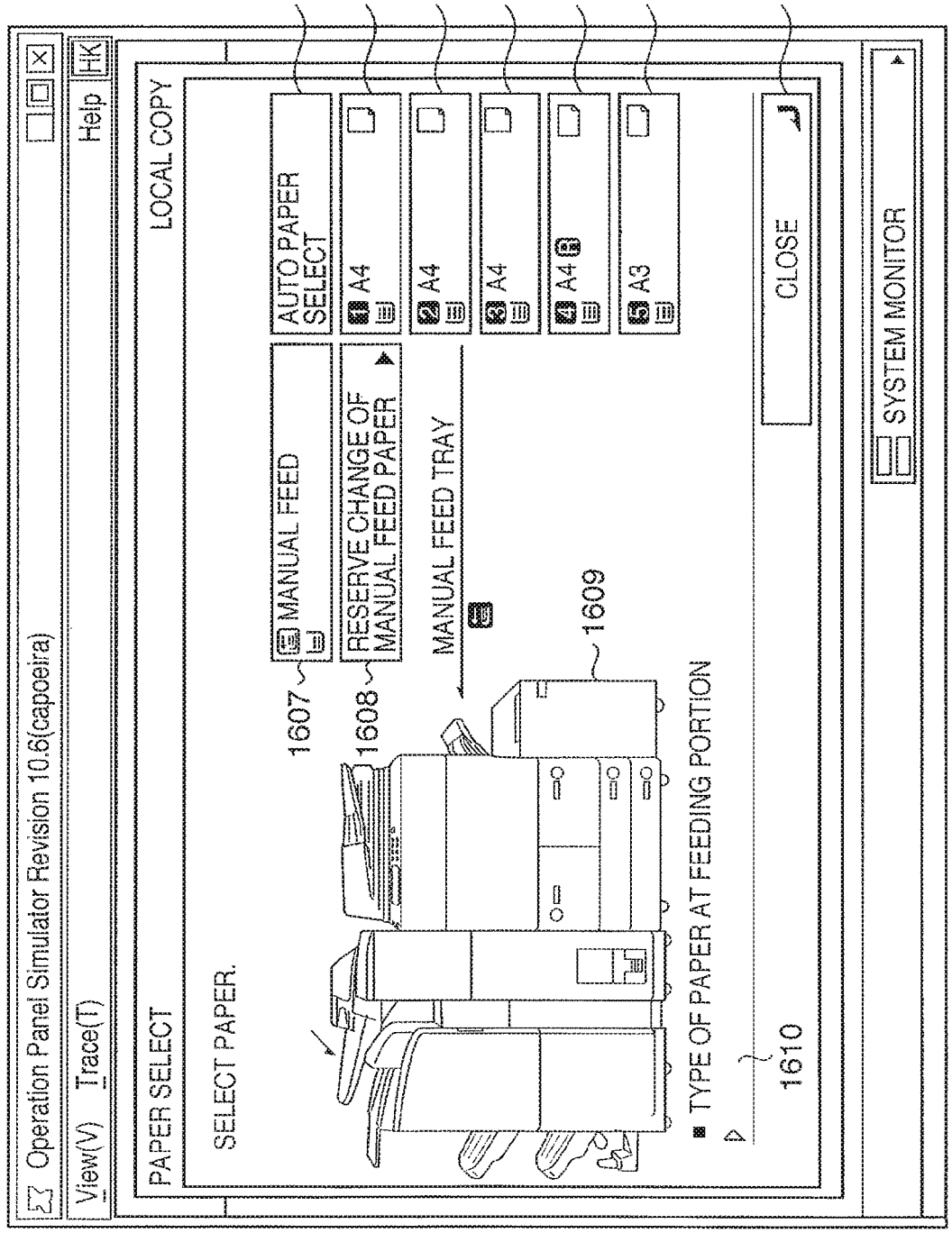
FIG. 16 is a view for explaining a display control example on the touch panel section when a print sheet is selected.

FIG. 16 shows a window displayed on the touch panel 401 when the user selects the paper selection key 615 in FIG. 6. This window displays information on print sheets set in the feeding unit inside the main body. The controller 110 accepts, from the user via this window, the setting of the type of print sheet used for output. When the user selects an auto paper selection key 1601, the controller 110 sets a mode (auto paper selection mode) in which the controller 110 automatically selects and outputs a print sheet in accordance with the read document size and operation mode.

Feeding stage keys 1602 to 1606 display the sizes, orientations, and remaining numbers of print sheets stored in corresponding feeding stages. When the user selects one of the feeding stage keys, the controller 110 sets feeding of sheets from a selected feeding stage. A manual feed key 1607 displays the size and orientation of print sheets on a manual feed tray. When the user selects the manual feed key 1607, the controller 110 sets feeding of sheets from the manual feed tray. If no print sheet is loaded on the manual feed tray, the controller 110 grays out the manual feed key 1607, as shown in FIG. 16, so as not to accept selection of the key 1607. This also applies to the feeding stage keys 1602, 1603, 1604, 1605, and 1606. If no print sheet is stored in a feeding stage, the controller 110 grays out a corresponding key so as not to accept selection of the key.

A manual feed sheet change reservation key 1608 is used to set print sheets for use when no print sheet is loaded on the manual feed tray or when print sheets different from ones currently loaded on the manual feed tray are to be used. If the user selects the key 1608, the controller 110 displays a window (not shown) for setting the size and type of print sheet to be loaded on the manual feed tray. If print sheets set in this window are loaded on the manual feed tray, they are fed from the manual feed tray. If no set print sheet is loaded on the manual feed tray, the controller 110 displays the absence of print sheets without outputting any print sheet, and prompts the user to load print sheets on the manual feed tray. A main body display portion 1609 illustrates the schematic appearance of the main body. When the user selects one of the feeding stage keys 1602 to 1606 and manual feed key 1607, a corresponding feeding portion is highlighted so that the user can easily recognize the set feeding stage. A paper type display portion 1610 displays the type of print sheet set in a feeding unit corresponding to a currently selected one of the feeding stage keys 1602 to 1606 and manual feed key 1607. When the user selects a close key 1611, the window in FIG. 16 returns to the copy setup window shown in FIG. 6.

<Description of Operation Sequence>

A setting sequence for Z-folding and C-folding will be described. FIGS. 17A to 20B are views for explaining operation sequences when Z-folding and C-folding are set.

Figure 17A:
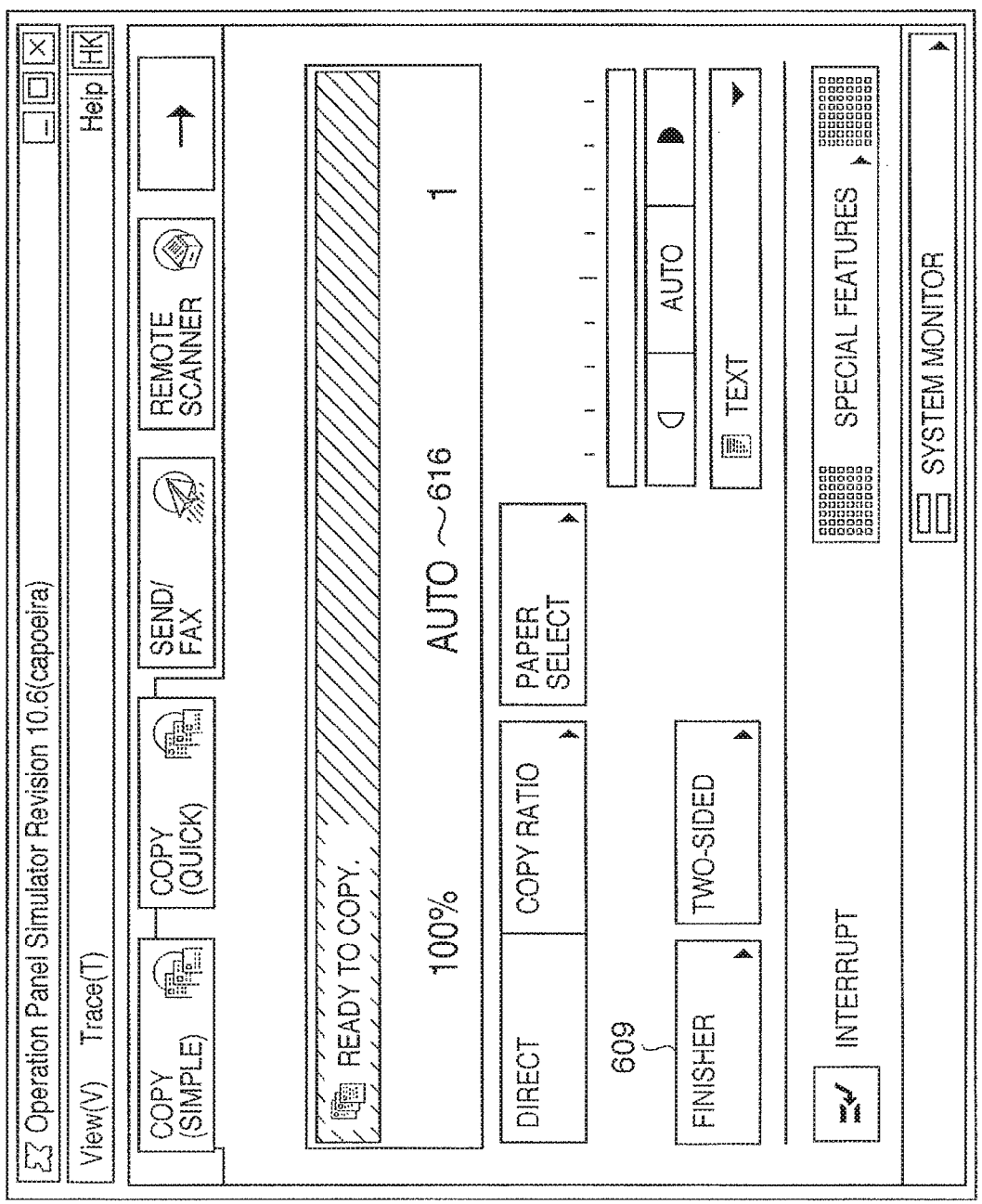
FIGS. 17A to 17H are views for explaining Z- and C-folding setting display sequences.
Figure 17B:
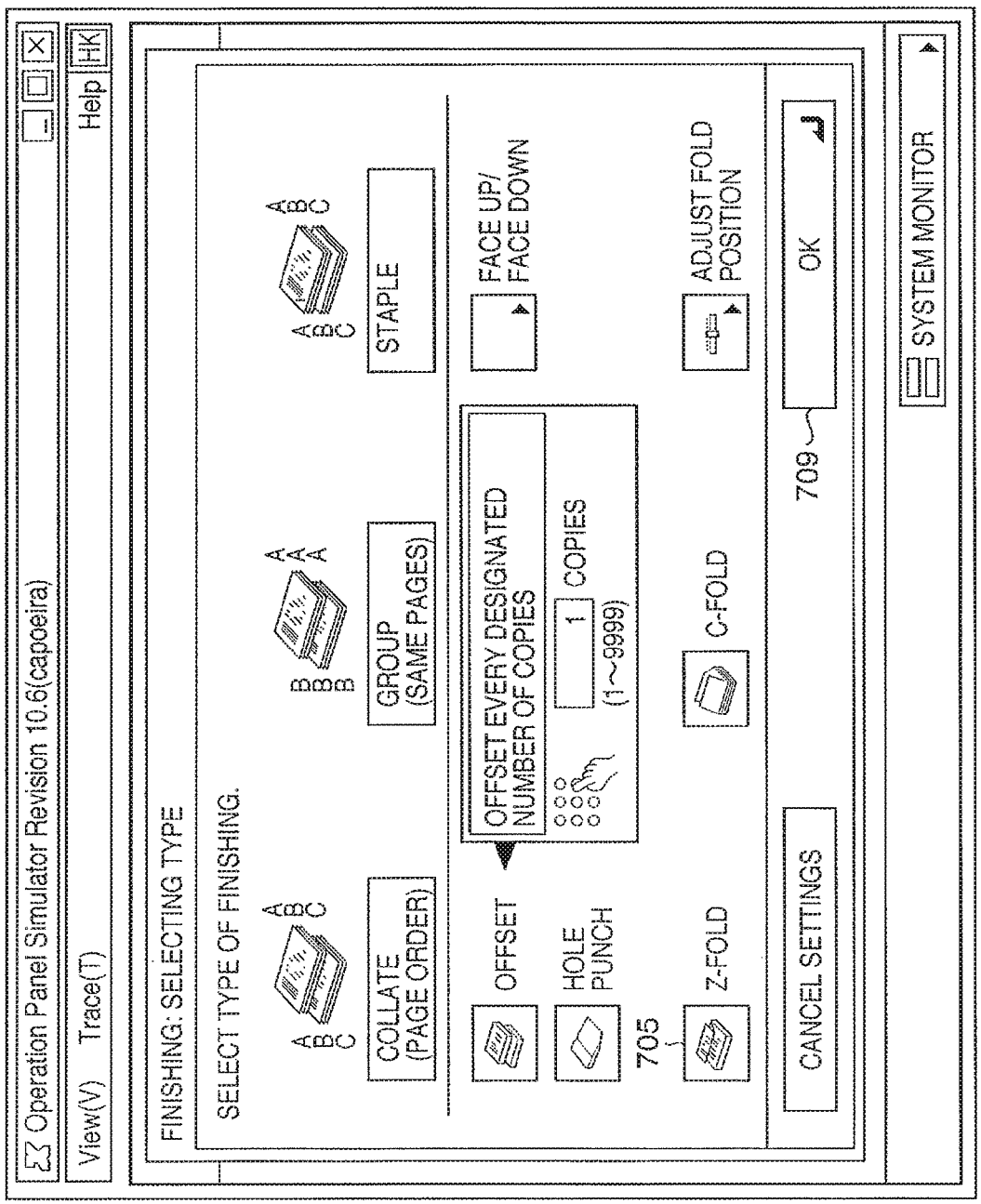

An operation sequence for setting of Z-folding will be described. FIG. 17A shows the first window of a copy setup window, similar to the window shown in FIG. 6. If no setting has been made, the auto paper selection mode is set first, and the display field 616 displays auto paper selection. If the user selects the finishing key 609, the controller 110 displays a finishing setup window shown in FIG. 17B. FIG. 17B shows the same window as that shown in FIG. 7. According to the operation sequence for setting of Z-folding, if the user selects the Z-folding key 705 in the window of FIG. 17B, the controller 110 highlights the Z-folding key 705 and stores the setting of Z-folding. If the user selects the OK key 709, the controller 110 displays a window shown in FIG. 17C.

Figure 17C:
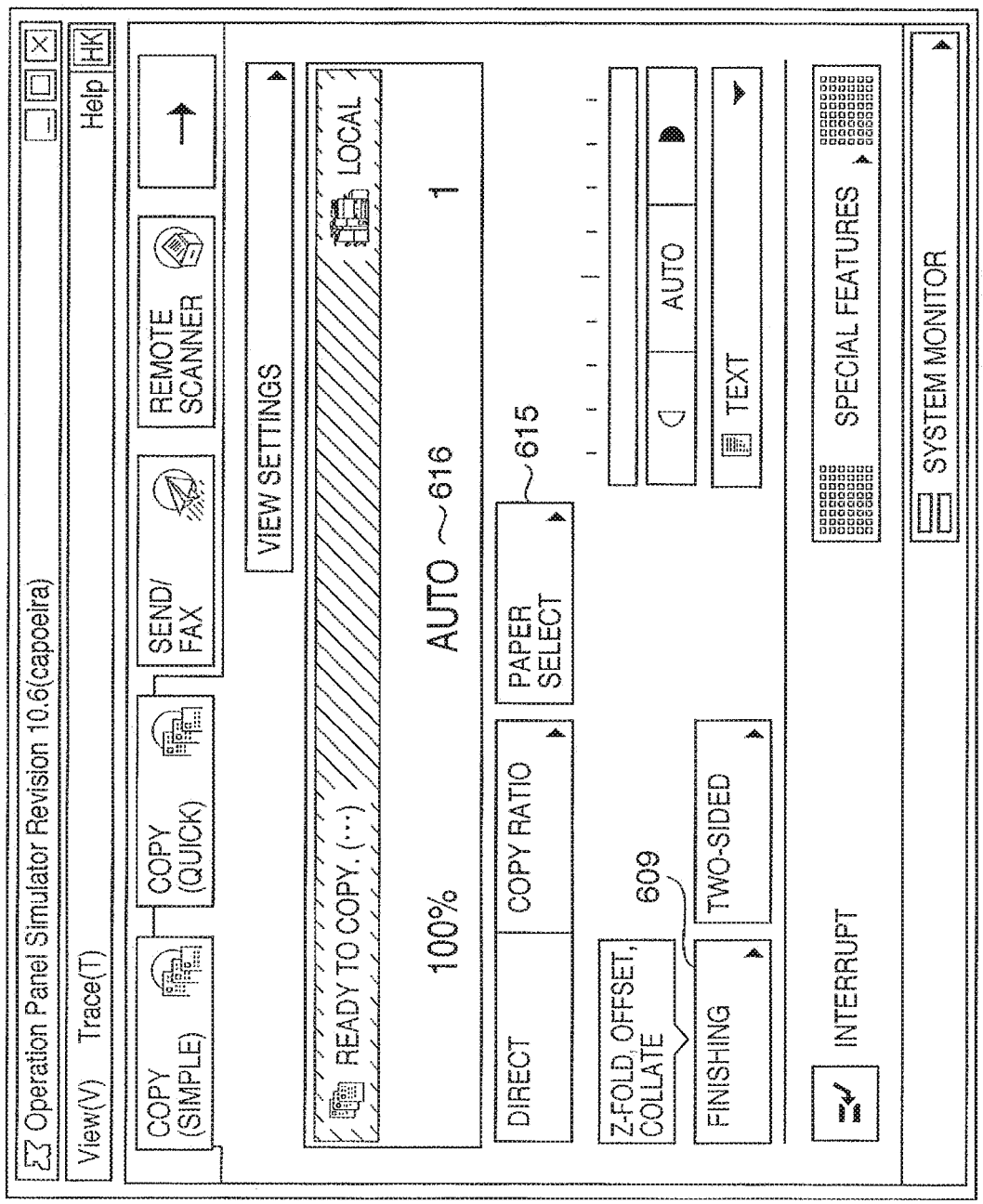
Figure 17D:
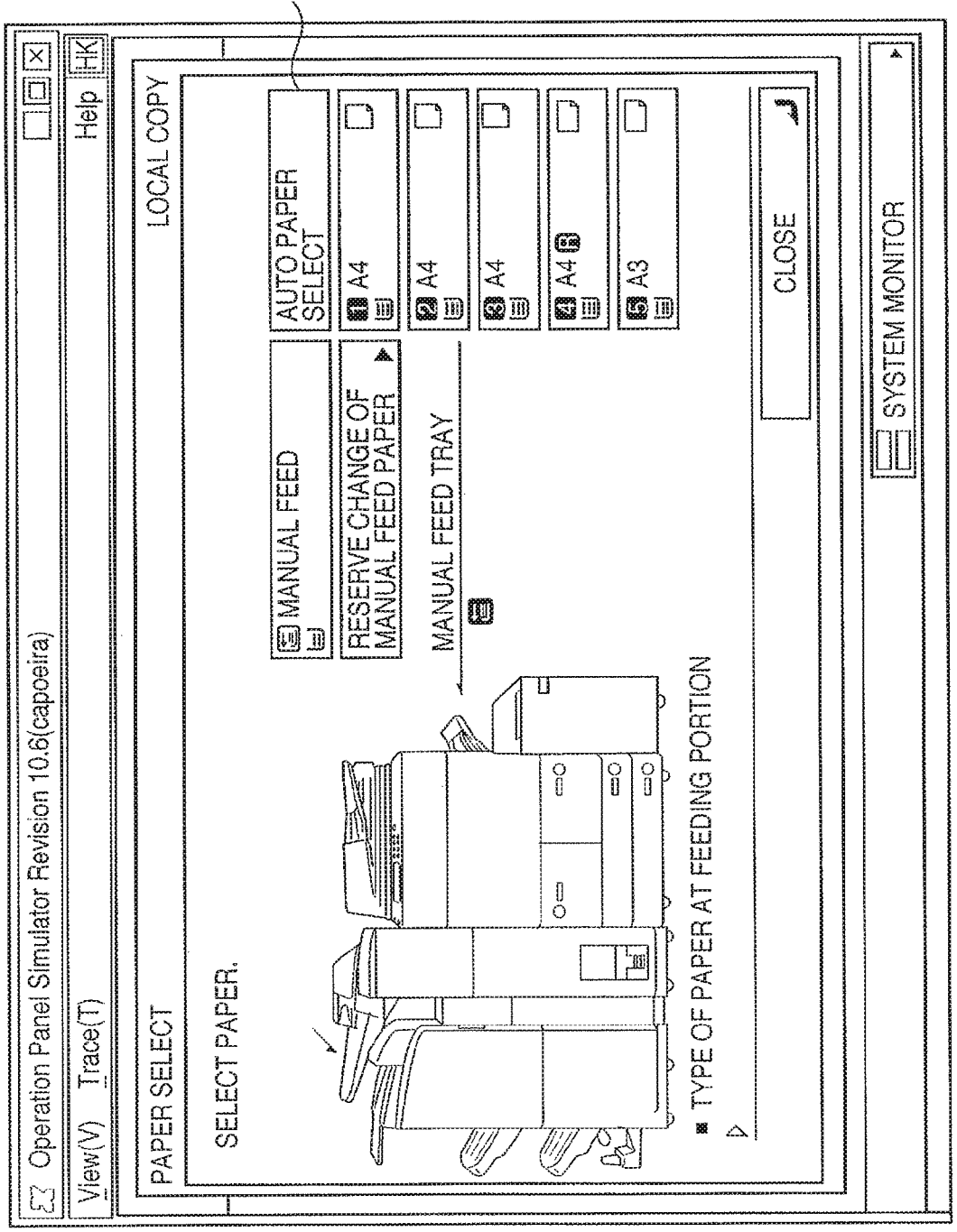

The window in FIG. 17C is the same as that shown in FIG. 6. Since Z-folding is set, the finishing key 609 is highlighted, and information representing that Z-folding is set is displayed above the finishing key 609. Since the auto paper selection mode is kept selected, the display field 616 displays auto paper selection. If the user presses the start key 503, the controller 110 starts a copy job in the Z-folding/auto paper selection mode. If the user selects the paper selection key 615 in FIG. 17C, the controller 110 displays a paper selection window in FIG. 17D. FIG. 17D shows the same window as that shown in FIG. 16. In FIG. 17D, since the auto paper selection mode is set, the auto paper selection key 1601 is highlighted. The user can set a feeding stage manual setting mode instead of the auto paper selection mode by selecting the feeding stage key, manual feed key, or manual feed sheet change reservation key in the window of FIG. 17D.

Figure 17E:
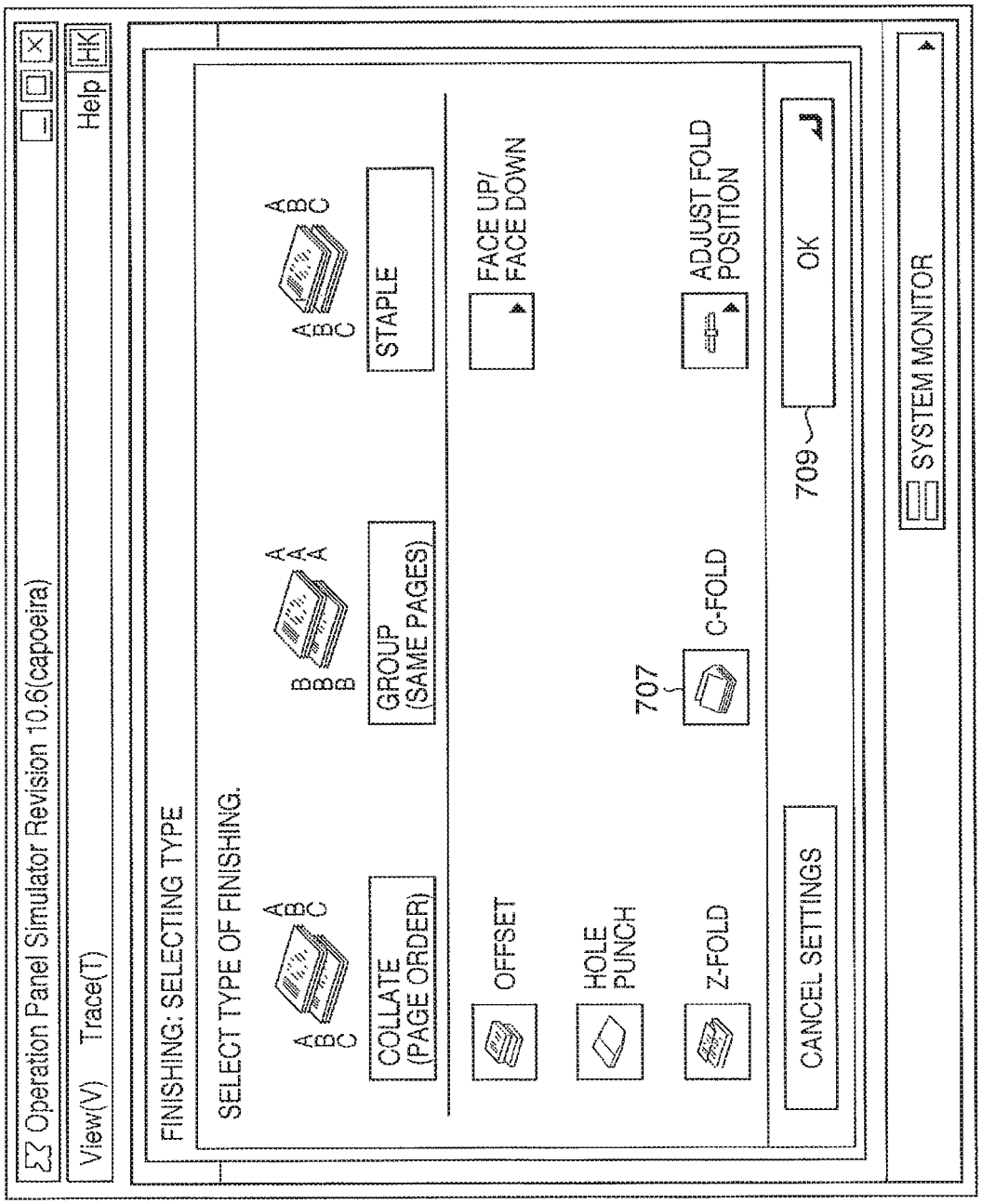
Figure 17F:
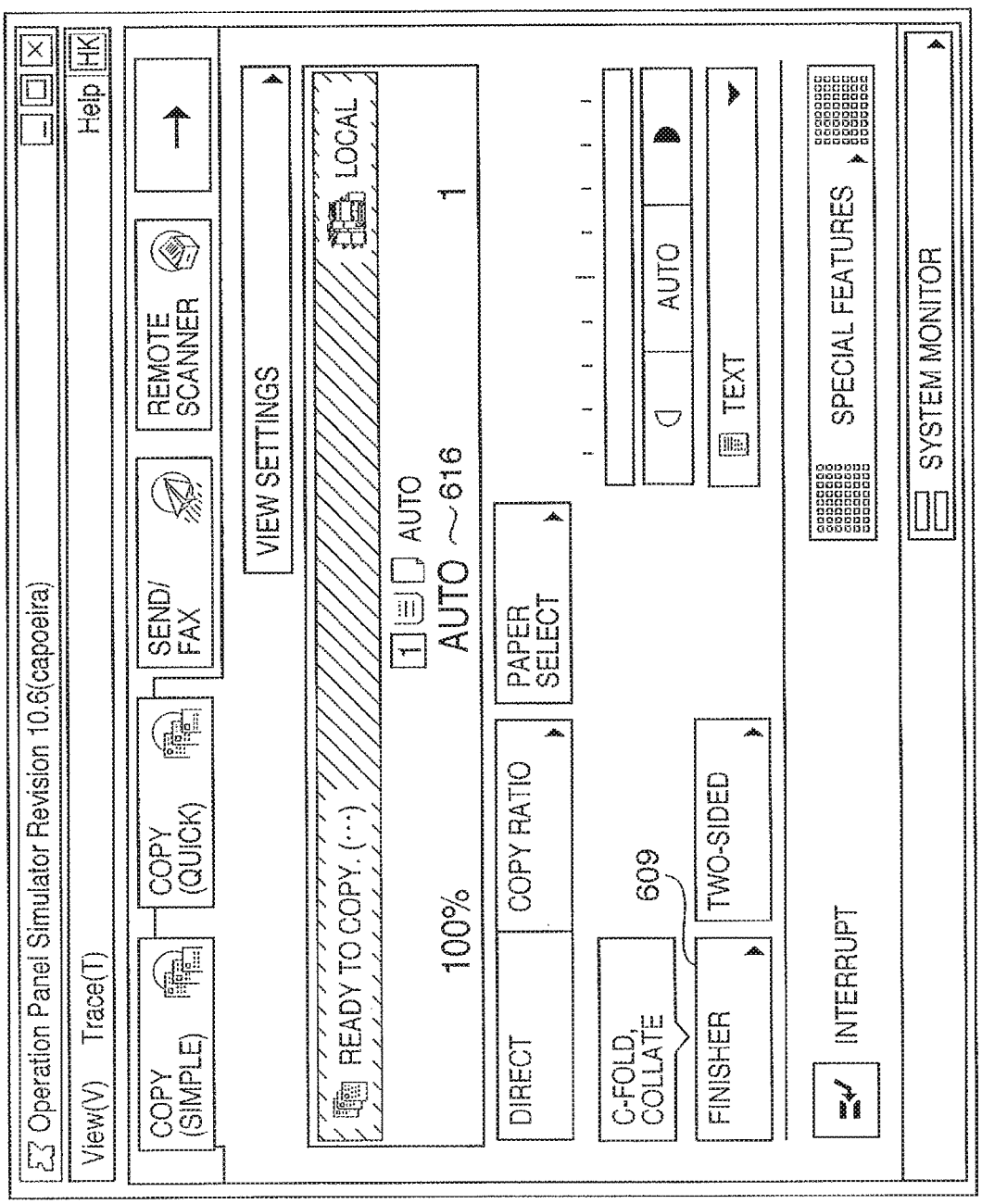

An operation sequence for setting of C-folding will be described. This sequence starts from the window in FIG. 17A, similar to Z-folding. If the user selects the finishing key 609 in the window of FIG. 17A, the controller 110 displays a finishing setup window in FIG. 17E. FIG. 17E also shows the same window as that shown in FIG. 7. If the user selects the C-folding key 707 in the window of FIG. 17E, the controller 110 highlights the C-folding key 707 and stores the setting of C-folding. If the user selects the OK key 709, the controller 110 shifts to the setting of C-folding. At this time, the controller 110 cancels the auto paper selection mode, shifts to the feeding stage manual selection mode, and displays a window shown in FIG. 17F. FIG. 17F shows the same window as that shown in FIG. 6. Since C-folding is set, the finishing key 609 is highlighted, and information representing that C-folding is set is displayed above the finishing key 609. Since the feeding stage manual selection mode is selected, the display field 616 displays feeding stage 1 which is a default setting.

Figure 17G:
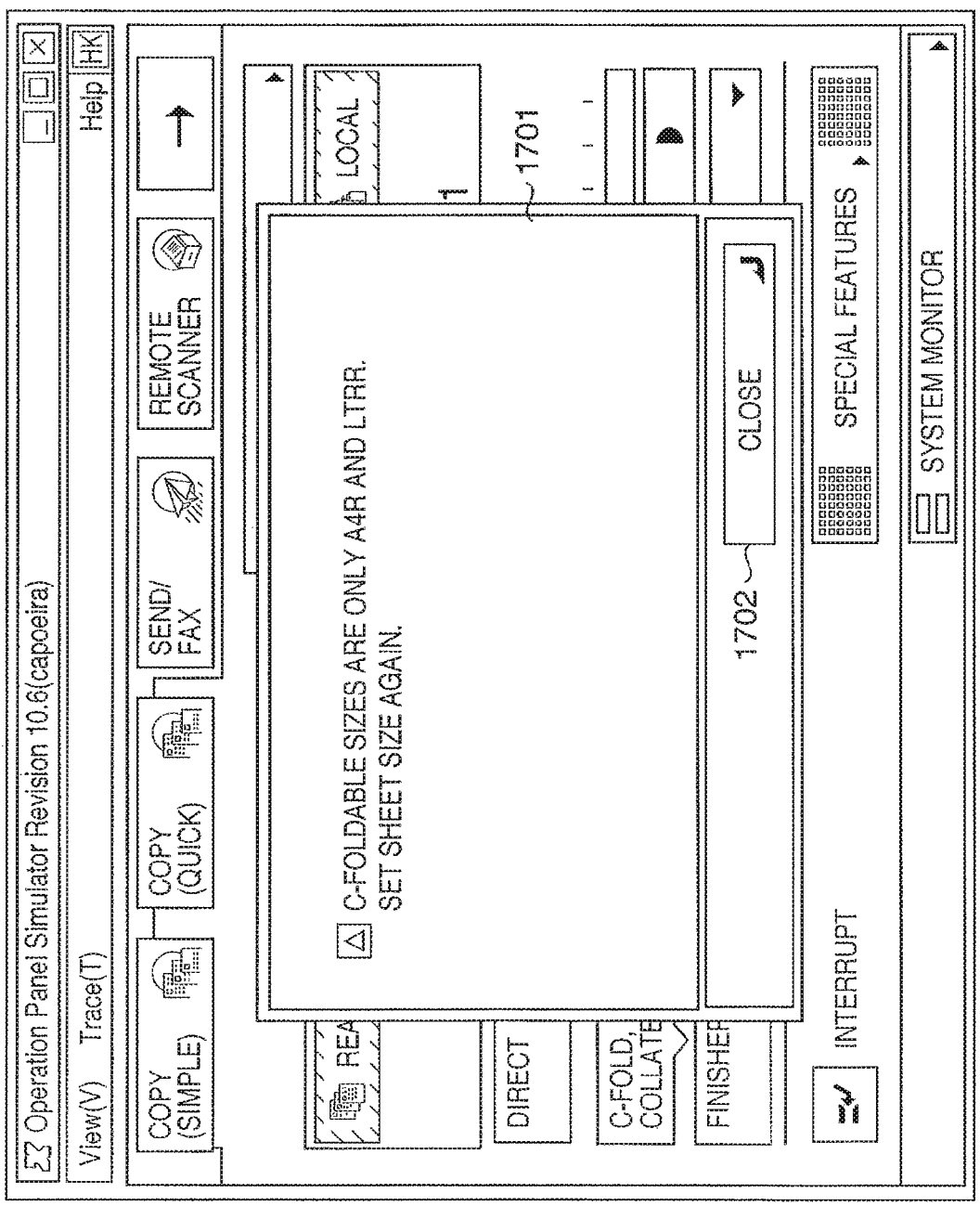

If the user selects the start key 503, the controller 110 determines whether print sheets set in feeding stage 1, in this case, A4-size print sheets can be C-folded. A4-size print sheets cannot be C-folded, so the controller 110 displays a window shown in FIG. 17G without starting a copy job. In FIG. 17G, the controller 110 displays the C-folding setting and C-foldable print sheet sizes in a dialog 1701, and prompts the user to set a feeding stage again. If the user selects an OK key 1702, the controller 110 displays the window in FIG. 17F again.

Figure 17H:
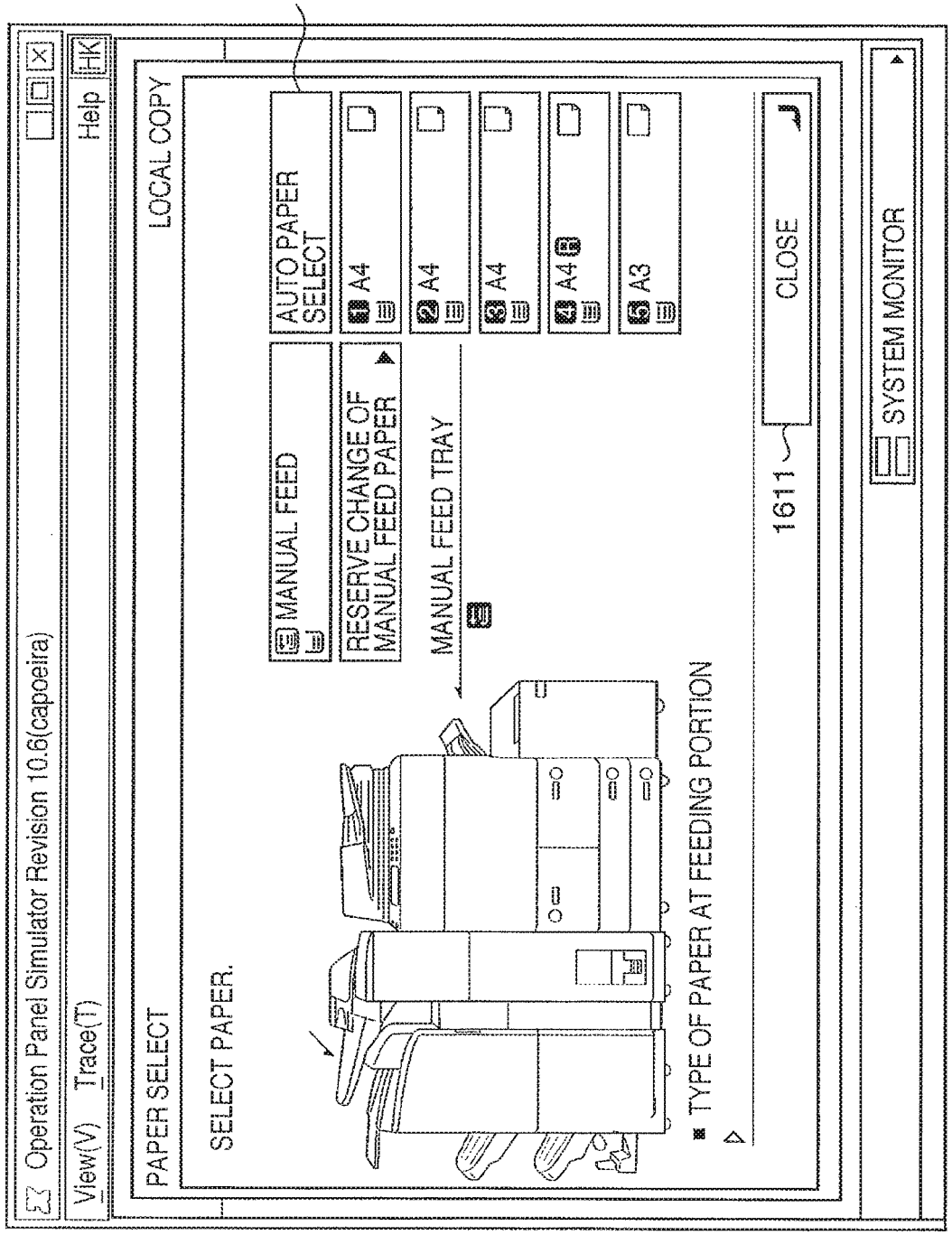

If the user selects the paper selection key 615 in accordance with the instruction displayed in the dialog 1701, the controller 110 displays a window shown in FIG. 17H. FIG. 17H shows the same window as the paper selection window shown in FIG. 16. The controller 110 determines that C-folding is set. The controller 110 hatches the auto paper selection key 160 to inhibit the user from selecting it. The user does not erroneously select the auto paper selection key 1601, and selects any feeding stage. In FIG. 17H, if the user selects a proper feeding stage (feeding stage 4 storing A4R-size print sheets in FIG. 17H) displayed in the dialog 1701, and selects the close key 1611, the controller 110 displays the window in FIG. 17F again. If the user selects the start key 503, the controller 110 determines whether print sheets in the manually set feeding stage are C-foldable. In this case, A4R-size print sheets are C-foldable, and the controller 110 starts a copy job. In the above description, the window shifts to one in FIG. 17F upon selecting the OK key 1702 in FIG. 17G, but may also shift to one in FIG. 17H.

In this fashion, the operation unit 150 can function as a designation means for designating post-processing to be performed by a post-processing means. The controller 110 and operation unit 150 can function as a selection means for selecting the type of sheet on which an image is to be formed by an image forming means. The image input/output system 100 operates in the auto paper selection mode serving as the first selection mode in which sheets of a type corresponding to an image to be formed are automatically selected, and the manual paper selection mode serving as the second selection mode in which sheets of a type designated by the user are selected. When the user designates Z-folding serving as the first post-processing, the controller 110 controls the operation unit 150 to permit selection of Z-folding in the first and second selection modes. When the user designates C-folding serving as the second post-processing, the controller 110 controls the operation unit 150 to inhibit selection of C-folding in the first selection mode and permit selection of it in the second selection mode. In other words, the operation unit 150 functions as an input means for inputting designation of the first or second selection mode from the user. When the user designates C-folding serving as the second post-processing, the operation unit 150 does not accept designation of the auto paper selection mode serving as the first selection mode. The touch panel of the operation unit 150 functions as a notification means for, when the user designates C-folding serving as the second post-processing, notifying the user of the types of sheets which can be designated in the manual paper selection mode serving as the second selection mode.

<Control at C/Z-Folding Setting>

Figure 19:
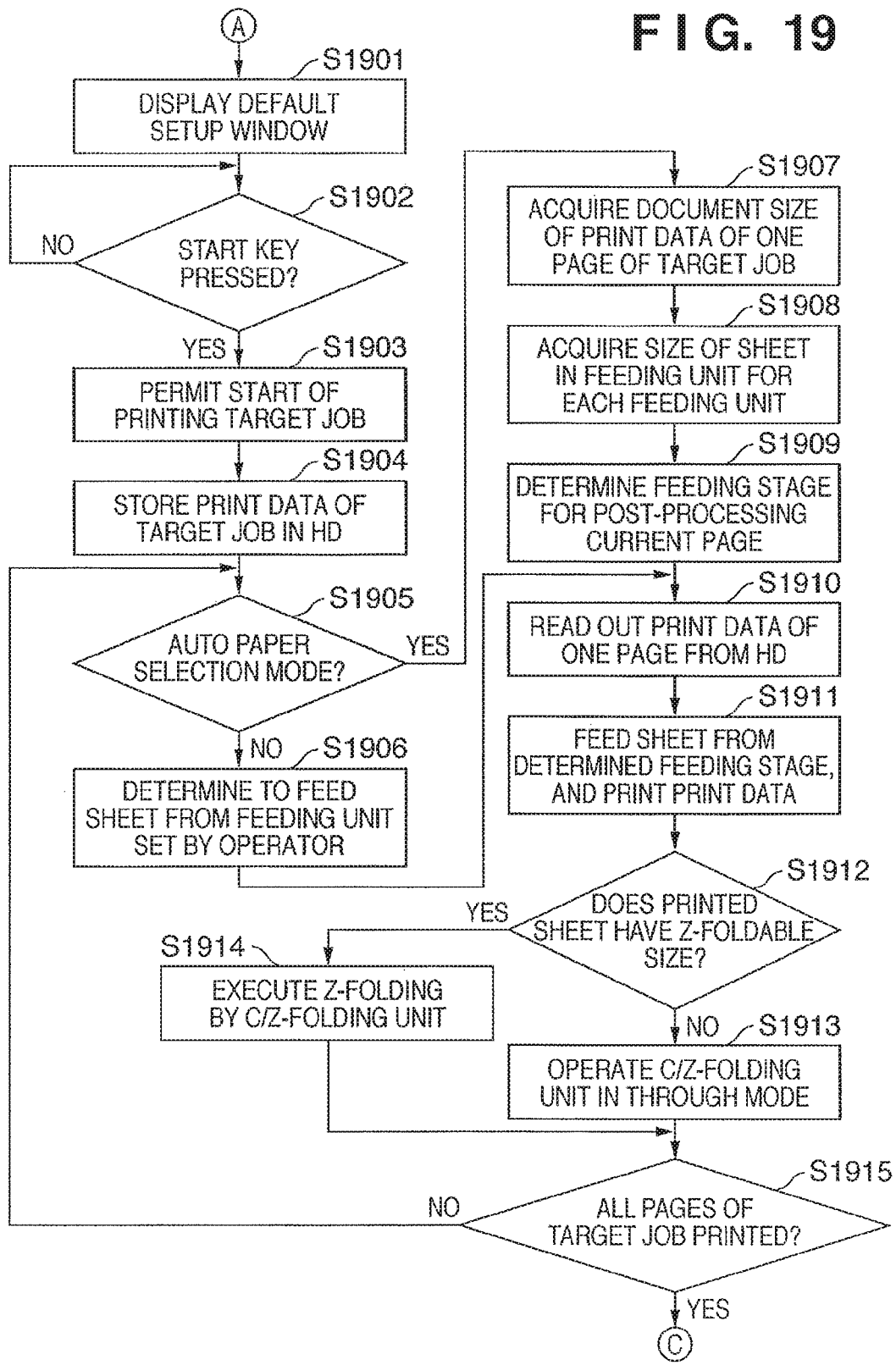
FIG. 19 is a control flowchart of a print operation when Z-folding is set.
Figure 20A:
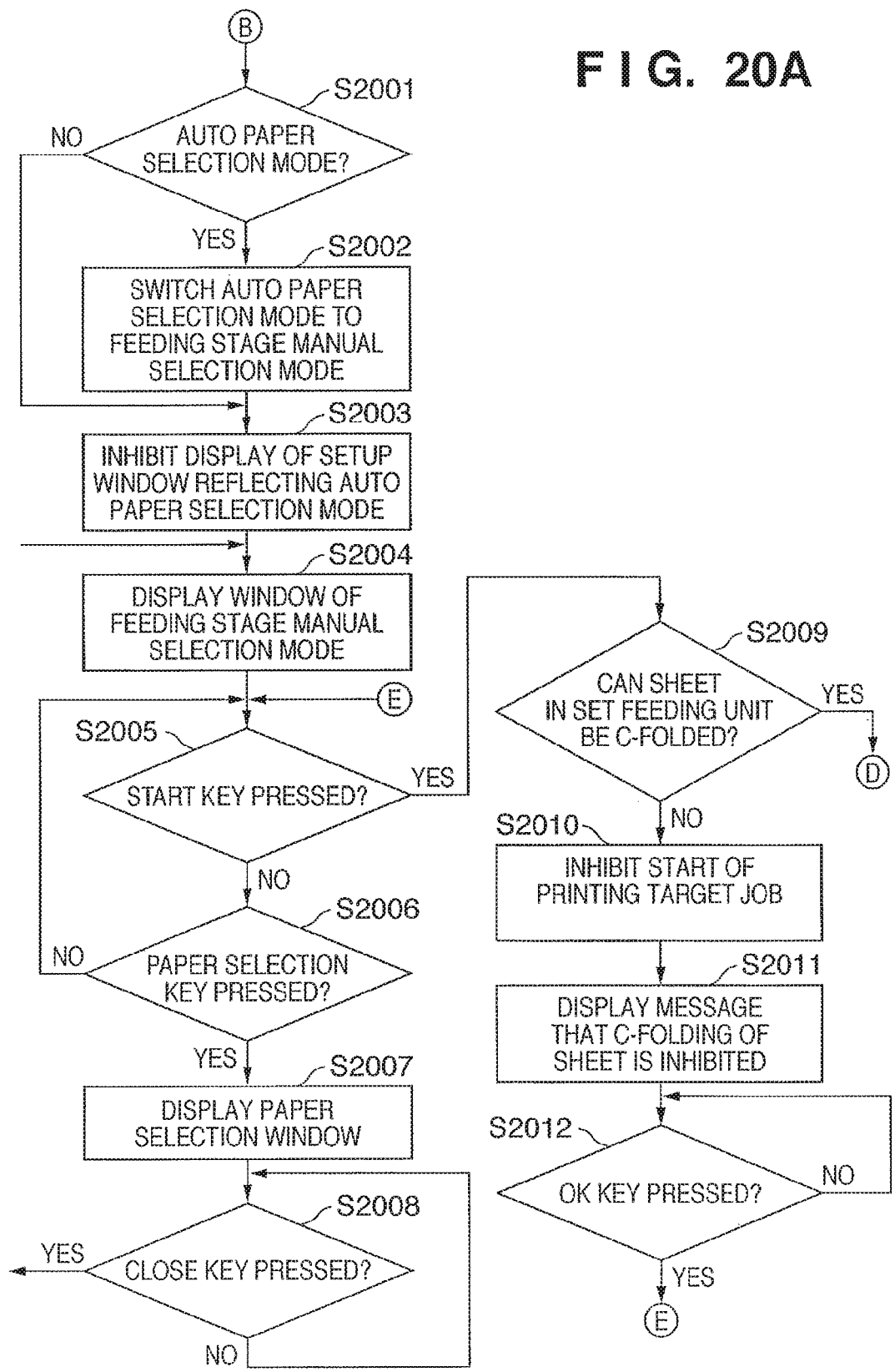
FIGS. 20A and 20B are control flowcharts of a print operation when C-folding is set.
Figure 20B:
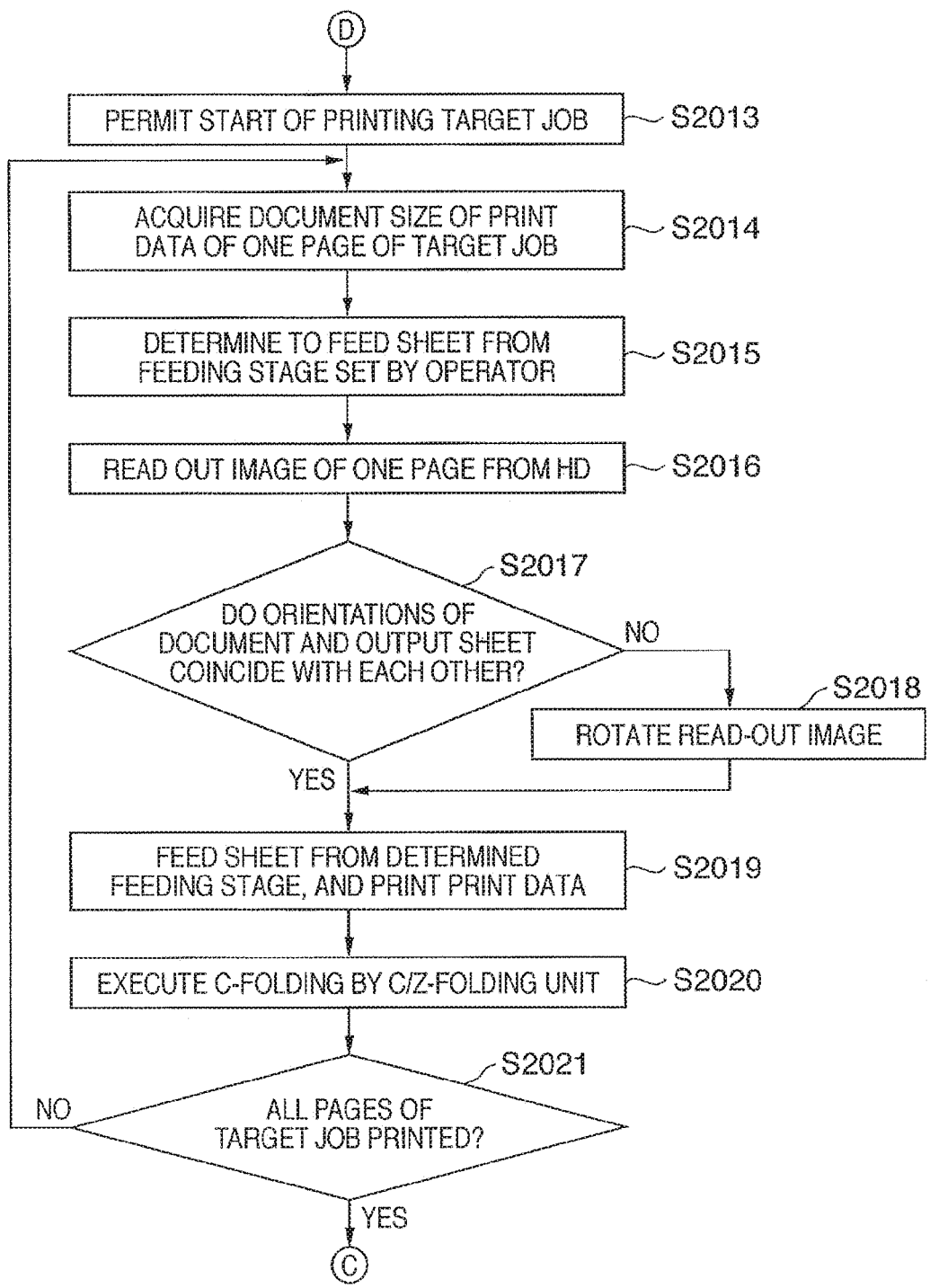

Details of processing by the controller 110 will be explained with reference to the flowcharts of FIGS. 18, 19, and 20B.

In step S1802, the controller 110 causes the touch panel 401 to display a default copy function setup window. In this case, the touch panel 401 displays the window in FIG. 17A. The process proceeds to step S1803 to accept the processing conditions of a print job that are set by the operator on the touch panel 401. Every time the operator operates the touch panel 401, the controller 110 determines in step S1804 whether the operator has selected the start key 503. If the operator has not selected the start key 503, the process proceeds to step S1805 to determine whether the operator has selected the finishing key 609. If the operator has not selected the finishing key 609, the controller 110 determines whether the operator has selected another key, and executes processing corresponding to the selected key. A description of settings unrelated to folding setting will be omitted. Then, the process returns to step S1803 and waits for the next operation by the operator.

If the controller 110 determines in step S1805 that the operator has selected the finishing key, the process proceeds to step S1806 to display a finishing type setup window in FIG. 17B or 17C. If the operator selects the Z-folding key 705, the controller 110 highlights the Z-folding key 705 as shown in FIG. 17B. If the operator selects the C-folding key 707, the controller 110 highlights the C-folding key 707 as shown in FIG. 17C. Since Z-folding and C-folding cannot be simultaneously set, either the Z-folding key 705 or C-folding key 707 is highlighted every time the operator selects either one. After that, the process proceeds to step S1807 to determine whether the operator has selected the OK key 709.

If the controller 110 determines in step S1807 that the operator has not selected the OK key 709, the process returns to step S1807 again and waits until he selects the OK key 709. If the controller 110 determines in step S1807 that the operator has selected the OK key 709, the process proceeds to step S1808 to determine whether the operator has designated Z-folding. If the operator has designated Z-folding, the process proceeds to step S1901 in the flowchart of FIG. 19. If the controller 110 determines in step S1808 that the operator has not designated Z-folding, the process proceeds to step S1809 to determine whether the operator has designated C-folding. If the operator has designated C-folding, the process proceeds to step S2001 in the flowchart of FIG. 20A. If the controller 110 determines in step S1809 that the operator has not designated C-folding, the process returns to step S1802 to display the window in FIG. 17A.

If the controller 110 determines in step S1804 that the operator has pressed the start key 503, the process proceeds to step S1810. In this case, the operator has designated the start of a print job without setting Z-folding or C-folding. In step S1810, the controller 110 instructs the reading section 200 to start scanning. The reading section 200 scans a document on the document feeding unit 250, and transmits a document image signal to the controller 110. The controller 110 stores the transmitted document image signal as print data for each page in the hard disk 162. At this time, the controller 110 also stores a document size detected by the document feeding unit 250 in the hard disk 162 together with the document image signal. After the end of storing print data, the process proceeds to step S1811 to start print processing. In step S1811, the controller 110 reads out print data of one page from the hard disk 162 to the DRAM 116. Then, the process proceeds to step S1812 to feed a print sheet from a feeding unit set by the operator and print the print data in the DRAM 116.

In step S1813, the controller 110 determines whether the operator has set finishing such as stapling other than folding. If the operator has set another finishing, the controller 110 causes the finisher 900 in step S1814 to execute finishing, execution of which has been set. Then, the process proceeds to step S1815. If the controller 110 determines in step S1813 that execution of finishing is not set, the process proceeds to step S1815 without performing the process in step S1814. In step S1815, the controller 110 determines whether all pages of the target job have been printed. If print data of an unprinted page exists in the hard disk 162, the process returns to step S1811 to print the next page. If the controller 110 determines in step S1815 that all pages of the target job have been printed, the process proceeds to step S1816 to determine whether another job to be processed exists in the hard disk 162. If another job to be processed exists, the controller 110 sets the job as a target job, returns to step S1811, and starts printing. If the controller 110 determines in step S1816 that no job to be processed exists, the process returns to step S1802 to display the window in FIG. 17A, and waits for an operation by the operator.

Control by the controller 110 when determining in step S1808 that the operator has designated Z-folding will be described with reference to the flowchart of FIG. 19. The process proceeds to step S1901 in FIG. 19 when the operator selects the Z-folding key 705 in the window of FIG. 17B to highlight the Z-folding key 705, and further selects the OK key 709. The controller 110 proceeds to step S1901 to display a default setup window. In the displayed window, the finishing key 609 is highlighted to represent that Z-folding is set, as shown in FIG. 17C. The process proceeds to step S1902 and waits until the operator selects the start key 503. If the operator selects the start key 503, the process proceeds to step S1903 to permit the start of printing the target job.

Figure 18:
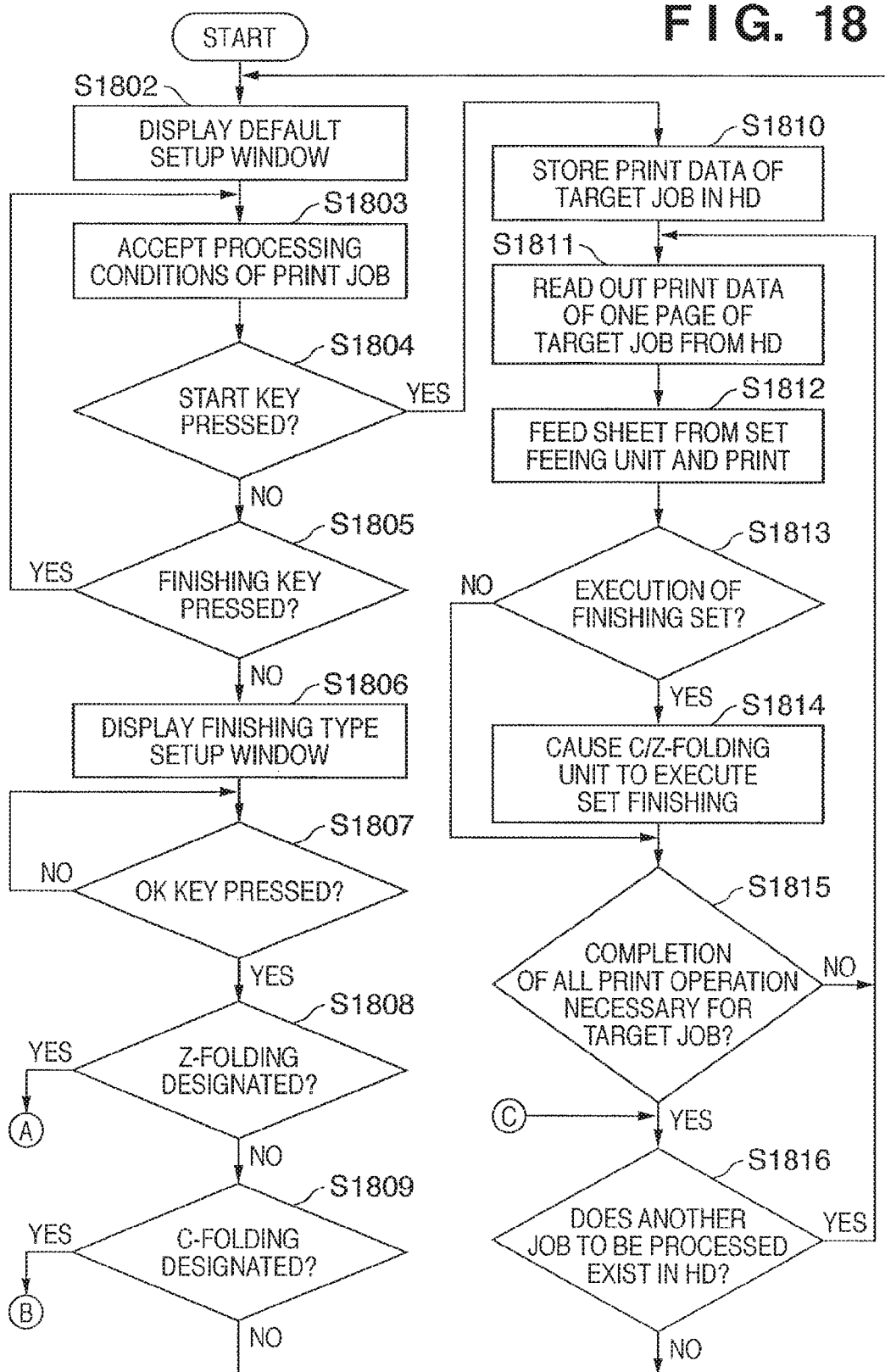
FIG. 18 is a control flowchart of a print operation when Z-folding and C-folding are set and when neither Z-folding nor C-folding is set.

The process proceeds to step S1904 to perform the same process as that of step S1810 described in FIG. 18 and store print data and a document size in the hard disk 162. The process proceeds to step S1905 to determine a feeding unit selection mode. One of selection modes determined in step S1905 is the auto paper selection mode in which the controller 110 automatically selects a feeding unit used for the print operation of a target job based on the document size of the target job and print media present in the feeding unit of the printing apparatus. The other selection mode is the feeding unit manual selection mode in which the controller 110 prompts the operator to explicitly designate a feeding unit. If the controller 110 determines in step S1905 that the feeding unit manual selection mode is set, the process proceeds to step S1906 to determine that print sheets are fed from a feeding stage set by the operator. Then, the process proceeds to step S1910. If the controller 110 determines in step S1905 that the auto paper selection mode is set, the process advances to step S1907 to determine a feeding unit.

In step S1907, the controller 110 acquires, from the hard disk 162, the document size of print data of one page of the target job. The process proceeds to step S1908 to acquire, for each feeding unit, the size of print sheets present in the feeding unit of the printing apparatus. The process proceeds to step S1909 to determine a feeding stage for processing the current page on the basis of the document size and print sheet size. If there are print sheets whose size coincides with the document size, the controller 110 determines to use a feeding unit storing these print sheets. If there are no print sheets whose size coincides with the document size, the controller 110 determines to use print sheets which are larger than the document size and the smallest among print sheets present in feeding units.

After determining a feeding unit for use, the process proceeds to step S1910 to read out print data of one page from the hard disk 162 to the DRAM 116. The process proceeds to step S1911 to feed print sheets from a feeding stage set by the operator in step S1906 or a feeding stage determined in step S1909, and print the print data in the DRAM 116. Subsequently, the process proceeds to step S1912 to determine whether the size of a printed sheet can be Z-folded. For example, when the document size is A4 and print data is printed on an A4-size print sheet, the controller 110 determines that the print sheet cannot be Z-folded. The process proceeds to step S1913 to operate the C/Z-folding unit 820 in the through mode without performing Z-folding. To the contrary, when the document size is A3 and print data is printed on an A3-size print sheet, the controller 110 determines that the print sheet can be Z-folded. The process proceeds to step S1914 to Z-fold the print sheet by the C/Z-folding unit 820. In this manner, in step S1912, the controller 110 determines not to Z-fold a print sheet in the portrait orientation (a print sheet fed along the long side) but to Z-fold a print sheet in the landscape orientation (a print sheet fed along the short side). When A4- and A3-size documents coexist, printing results can be aligned.

In step S1915, the controller 110 determines whether all pages of the target job have been printed. If the controller 110 determines in step S1915 that a page to be processed exists in the hard disk 162, the process returns to step S1905 to determine a feeding stage for the next page and execute print processing. If the controller 110 determines in step S1915 that all pages have been printed, the process proceeds to step S1816 in FIG. 18 to determine whether to perform print processing of another job or end the print processing.

Control by the controller 110 when determining in step S1809 that the operator has designated C-folding will be described with reference to the flowcharts of FIGS. 20A and 20B. The process proceeds to step S2001 in FIG. 20A when the operator selects the C-folding key 707 in the window of FIG. 17E to highlight the C-folding key 707, and further selects the OK key 709. The controller 110 proceeds to step S2001 to determine which of the auto paper selection mode and feeding unit manual selection mode is set. If the auto paper selection mode is set, the process proceeds to step S2002 to switch the auto paper selection mode to the feeding stage manual selection mode. Then, the process proceeds to step S2003. If the controller 110 determines in step S2001 that the feeding stage manual selection mode is set, the process proceeds to step S2003 without performing the process in step S2002. In step S2003, the controller 110 inhibits display of a setup window reflecting the auto paper selection mode. Then, the process proceeds to step S2004 to display the window of the feeding stage manual selection mode. The displayed window is one in FIG. 17F. The finishing key 609 is highlighted to represent C-folding. The feeding stage manual selection mode and any feeding stage are displayed in the feeding unit display field 616. In this window, the process waits for an operation by the operator. In step S2005, the controller 110 determines whether the operator has pressed the start key 503.

If the operator has not pressed the start key 503, the process proceeds to step S2006 to determine whether the operator has selected the paper selection key 615. If the operator has not selected the paper selection key 615, the process returns to step S2005 and waits for an operation by the operator. If the controller 110 determines in step S2006 that the operator has selected the paper selection key 615, the process proceeds to step S2007 to display a paper selection window. The displayed window is one in FIG. 17H. Since display of a setup window reflecting the auto paper selection mode is inhibited in step S2003, the auto paper selection key 1601 is hatched to inhibit the operator from selecting it. The process proceeds to step S2008 and waits for selection of the close key 1611. After the operator selects the close key 1611, the controller 110 sets, as a feeding stage used for the target job, a feeding stage corresponding to a feeding stage key finally selected by the operator. Then, the process returns to step S2004.

If the controller 110 determines in step S2005 that the operator has pressed the start key 503, the process proceeds to step S2009. In step S2009, the controller 110 acquires the print sheet size of the set feeding unit and determines whether the print sheet can be C-folded. The controller 110 determines that no print sheet can be C-folded when the print sheet is in the portrait orientation (the print sheet is fed from the long side), and that the print sheet can be C-folded when the print sheet is in the landscape orientation (the print sheet is fed from the short side). If the controller 110 determines in S2009 that no print sheet can be C-folded, the process proceeds to step S2010 to inhibit the start of printing the target job. The process proceeds to step S2011 to display a message that C-folding of the print sheet is inhibited. The displayed window is one in FIG. 17G. The dialog 1701 represents inhibition of C-folding the sheet, and C-foldable print sheet sizes. In step S2012, the process waits until the operator selects the OK key 1702. If the operator selects the OK key 1702, the process returns to step S2004 to display the window in FIG. 17F.

If the controller 110 determines in step S2009 that the print sheet can be C-folded, the process proceeds to step S2013 to permit the start of printing the target job. The process proceeds to step S2014 to acquire, from the hard disk 162, the document size of print data of one page of the target job. The process proceeds to step S2015 to determine to feed a print sheet from a feeding unit set by the operator. At this time, the controller 110 also acquires the print sheet size of the feeding stage. The process proceeds to step S2016 to read out print data of one page from the hard disk 162 to the DRAM 116. In step S2017, the controller 110 compares the document size acquired in step S2014 with the print sheet size acquired in step S2015, and determines whether the orientations of the document and print sheet are the same. As described above, the output print sheet is in the landscape orientation (the print sheet is fed from the short side). Thus, if the document image is in the portrait orientation (the document sheet is fed from the long side), the process proceeds to step S2018 to rotate the print data through 90° and align the orientation of the document image with that of the output print sheet. By this processing, even if an A4-size document in the portrait orientation is scanned, the document image can be printed exactly on an A4-size output print sheet in the landscape orientation.

Regardless of whether print data has been rotated, the process proceeds to step S2019 to feed a print sheet from the feeding stage determined in step S2015 and print the print data in the DRAM 116. The process proceeds to step S2020 to C-fold the printed sheet by the C/Z-folding unit 820. The process proceeds to step S2021 to determine whether all pages of the target job have been printed. If an unprinted page of the target job exists, the process returns to step S2014 to repeat determination of a feeding stage and print processing for the next page. If the controller 110 determines in step S2021 that all pages of the target job have been printed, the process proceeds to step S1816. The process proceeds to step S1816 in FIG. 18 to determine whether to perform print processing of another job or end the print processing.

According to the embodiment, the setup window is controlled to permit setting auto paper selection when C-folding is not designated, and inhibit setting auto paper selection when C-folding is designated. This can prevent selection of a print medium unsuitable for C-folding. By automatically switching the selection mode to the manual paper selection mode when auto paper selection is inhibited in accordance with the folding style setting, the user can be guided to manually select a sheet. Since re-setting of auto paper selection is inhibited when auto paper selection is inhibited in accordance with the folding style setting, it can be prevented to erroneously set auto paper selection by the user, thereby improving user-friendliness.

More specifically, a permissible print sheet selection mode is switched in accordance with the type of post-processing in an image forming system capable of executing a plurality of types of post-processes. This can prevent selection of a print sheet unsuitable for a designated type of post-processing, and improve user-friendliness. That is, a sheet can be properly selected in accordance with the type of post-processing.

OTHER EMBODIMENTS

The embodiment of the present invention has been described in detail. The present invention may also be applied to a system including a plurality of devices or an apparatus formed by a single device.

The present invention is also achieved by supplying a program for implementing the functions of the above-described embodiment to a system or apparatus directly or from a remote place, and reading out and executing the supplied program codes by the system or apparatus. Hence, the program codes installed in a computer in order to implement functional processing of the present invention by the computer also fall within the technical scope of the present invention.

In this case, the program form is arbitrary such as an object code, a program executed by an interpreter, or script data supplied to an OS as long as a program function is attained.

The recording medium for supplying the program includes a Floppy® disk, hard disk, optical disk, and magnetooptical disk. The recording medium also includes a MO, CD-ROM, CD-R, CD-RW, magnetic tape, nonvolatile memory card, ROM, and DVD (DVD-ROM and DVD-R).

As another use method, the program according to the present invention or a file including an automatic installing function can also be downloaded to a recording medium such as a hard disk by connecting a client PC to an Internet site via the browser of the client PC. It is also possible to group program codes which form the program of the present invention into a plurality of files, and download the files from different homepages. That is, a WWW server which allows a plurality of users to download the program for implementing functional processing of the present invention by a computer also falls within the scope of the present invention. The program according to the present invention may also be encrypted, stored in a storage medium such as a CD-ROM, and distributed to a user. A user who satisfies predetermined conditions is prompted to download decryption key information from a homepage via the Internet. The user can execute the encrypted program using the key information, and install the program in the computer.

The functions of the above-described embodiment can also be implemented when an OS or the like running on the computer performs some or all of actual processes based on the instructions of the program.

The present invention may also include a case where the program according to the present invention is written in the memory of the function expansion unit of a PC, and the CPU of the function expansion unit or the like executes some or all of actual processes based on the program.

The present invention can provide a technique capable of properly selecting a sheet in accordance with the type of post-processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-006421 filed on Jan. 15, 2007, which is hereby incorporated by reference herein in its entirety.

What is claimed is:

1. A printing system comprising:
a printer configured to print an image on a sheet;
a selection unit configured to select a folding;
a folder configured to perform the selected folding for the sheet on which the printer has printed the image; and
a display configured to display information so that a user recognizes a size of a sheet on which the folder can perform the selected folding.

2. The system according to claim 1, wherein the display displays the information including a plurality of sizes so that a user recognizes a size of a sheet on which the folder can perform the selected folding.

3. The system according to claim 1, wherein the display displays information so that a user recognizes a size of a sheet on which the folder can perform C-folding if the selection unit selects the C-folding.

4. The system according to claim 1, wherein the selection unit selects the folding as copy settings.

5. The system according to claim 1, further comprising an input device configured to input a copy start instruction,
wherein, when the input device inputs the copy start instruction, the display displays the information so that a user recognizes a size of a sheet on which the folder can perform the selected folding.

6. The system according to claim 1, wherein the folder is configured to perform a plurality of foldings including C-folding.

7. The system according to claim 6, wherein the plurality of foldings includes Z-folding.

8. The system according to claim 4, further comprising:
a controller configured to select a size of a sheet to be printed by the printer based on a size of an original,
wherein the display displays an auto-selecting-button for selecting the size selected by the controller in an unavailable manner in a case where the C-folding is selected as copy settings by the selection unit.

9. The system according to claim 8, wherein the printer prints the image on a sheet of a size, on which the folder can perform the C-folding, selected by the user.

10. The system according to claim 1, wherein the display displays a pop-up screen including the size of a sheet on which the folder can perform the selected folding as the information.

11. A display method comprising:
selecting a folding; and
displaying information so that a user recognizes a size of a sheet on which the selected folding is able to be performed.

12. The display method according to claim 11, wherein the displaying is displaying the information including a plurality of sizes so that a user recognizes a size of a sheet on which the selected folding is able to be performed.

13. The display method according to claim 11, wherein the displaying is displaying the information so that a user recognizes a size of a sheet on which C-folding is able to be performed if the C-folding is selected in the selecting.

14. The display method according to claim 11, wherein the folding is selected in the selection as copy settings.

15. The display method according to claim 11, further comprising receiving a print start instruction,
wherein, when the print start instruction is received, the displaying is performed.

16. The display method according to claim 11, further comprising performing the selected folding for the sheet on which an image has been printed.

17. The display method according to claim 11, further comprising performing C-folding and Z-folding.

18. The display method according to claim 14, further comprising:
selecting a size of a sheet to be printed based on a size of an original; and
displaying an auto-selecting-button for the selecting in an unavailable manner in a case where the selected folding is selected in the selecting.

19. The display method according to claim 11, wherein the displaying is displaying a pop-up screen including the size of a sheet on which the selected folding is able to be performed as the information.

20. A printing apparatus comprising:
a printer configured to print an image on a sheet;
a selection unit configured to select a folding; and
a display configured to display information so that a user recognizes a size of a sheet on which the selected folding is able to be performed.

21. The apparatus according to claim 20, wherein the display displays the information including a plurality of sizes so that a user recognizes a size of a sheet on which the selected folding is able to be performed.

22. The apparatus according to claim 20, wherein the display displays information so that a user recognizes a size of a sheet on which C-folding is able to be performed if the C-folding is selected.

23. The apparatus according to claim 20, wherein the selection unit selects the folding as copy settings.

24. The apparatus according to claim 20, further comprising an input device configured to input a copy start instruction, wherein, when the input device inputs the copy start instruction, the display displays the information so that a user recognizes a size of a sheet on which the selected folding is able to be performed.

25. The apparatus according to claim 23, further comprising:
a controller configured to select a size of a sheet to be printed by the printer based on a size of an original,
wherein the display displays an auto-selecting-button for selecting the size selected by the controller in an unavailable manner in a case where the C-folding is selected as copy settings by the selection unit.

26. The apparatus according to claim 25, wherein the printer prints the image on a sheet of a size, on which the C-folding is able to be performed, selected by the user.

27. The apparatus according to claim 20, wherein the display displays a pop-up screen including the size of a sheet on which the selected folding is able to be performed as the information.

28. The printing apparatus according to claim 20, wherein the selected folding is C-folding.

29. A printing apparatus comprising:
a printer configured to print an image on a sheet;
a selection unit configured to select a type of folding; and
a display configured to indicate a size of a sheet on which the selected type of folding is able to be performed.

30. The printing apparatus according to claim 29, wherein the selected type of folding is C-folding.

31. The printing apparatus according to claim 29, further comprising:
a scanner configured to read an original,
wherein the printer prints the image on the sheet based on image data obtained by reading the original, and
wherein the display indicates the size of the sheet before the printer prints the image on the sheet to be fold in accordance with the selected type.

32. The printing apparatus according to claim 29, further comprising an input device configured to input a copy start instruction, wherein when the input device inputs the copy start instruction, the display indicates a size of a sheet on which the selected type of folding is able to be performed.

33. The printing apparatus according to claim 29, wherein the size is displayed on a copy setting screen.

34. The printing apparatus according to claim 33, wherein the display displays an object with the size, and displays the copy setting screen based on a selection of the displayed object.

35. A printing apparatus comprising:
a printer configured to print an image on a sheet;
a selection unit configured to select a type of a folding; and
a display configured to display information with which a size of a sheet, on which the selected type of the folding is able to be performed, is recognizable.

36. The printing apparatus according to claim 35, wherein the selected type of folding is C-folding.

37. The printing apparatus according to claim 35, further comprising:
a scanner configured to read an original,
wherein the printer prints the image on the sheet based on image data obtained by reading the original, and
wherein the display the information before the printer prints the image on the sheet to be fold in accordance with the selected type.

38. The printing apparatus according to claim 35, further comprising an input device configured to input a copy start instruction, wherein when the input device inputs the copy start instruction, the display displays the information.

39. The printing apparatus according to claim 35, wherein the information is displayed on a copy setting screen.

40. The printing apparatus according to claim 39, wherein the display displays an object with the information, and displays the copy setting screen based on a selection of the displayed object.

* * * * *